(12) United States Patent
Kell et al.

(10) Patent No.: US 8,450,001 B2
(45) Date of Patent: May 28, 2013

(54) FLOW BATTER WITH RADIAL ELECTROLYTE DISTRIBUTION

(75) Inventors: Brad Kell, Pembroke, MA (US); Rick Winter, Orinda, CA (US); Jonathan Hall, San Mateo, CA (US)

(73) Assignee: Primus Power Corporation, Hayward, CA (US)

( * ) Notice: Subject to any disclaimer, the term of this patent is extended or adjusted under 35 U.S.C. 154(b) by 379 days.

(21) Appl. No.: 12/877,852

(22) Filed: Sep. 8, 2010

(65) Prior Publication Data

US 2012/0058370 A1 Mar. 8, 2012

(51) Int. Cl.
*H01M 2/38* (2006.01)

(52) U.S. Cl.
USPC .......................................... 429/81; 429/105

(58) Field of Classification Search
USPC .................................................... 429/81, 105
See application file for complete search history.

(56) References Cited

U.S. PATENT DOCUMENTS

| | | |
|---|---|---|
| 3,644,190 A | 2/1972 | Weist et al. |
| 3,713,888 A | 1/1973 | Symons |
| 3,773,561 A | 11/1973 | Bjorkman |
| 3,813,301 A | 5/1974 | Carr |
| 3,909,298 A | 9/1975 | Carr |
| 3,935,024 A | 1/1976 | Symons |
| 3,940,283 A | 2/1976 | Symons |
| 3,954,502 A | 5/1976 | Symons et al. |
| 3,993,502 A | 11/1976 | Bjorkman, Jr. |
| 4,001,036 A | 1/1977 | Berman et al. |
| 4,020,238 A | 4/1977 | Symons |
| 4,025,697 A | 5/1977 | Hart |
| 4,068,043 A | 1/1978 | Carr |
| 4,071,660 A | 1/1978 | Hart |
| 4,072,540 A | 2/1978 | Symons et al. |
| 4,086,393 A | 4/1978 | Hart |
| 4,100,332 A | 7/1978 | Carr |
| 4,115,529 A | 9/1978 | Behling |
| 4,127,701 A | 11/1978 | Symons et al. |
| 4,146,680 A | 3/1979 | Carr et al. |
| 4,154,902 A * | 5/1979 | Schwartz .................... 429/105 |

(Continued)

FOREIGN PATENT DOCUMENTS

| | | |
|---|---|---|
| JP | 63-314782 A | 12/1988 |
| JP | 02-010671 A | 1/1990 |
| WO | WO 2008/089205 A2 | 7/2008 |
| WO | WO 2011/011533 A3 | 1/2011 |

OTHER PUBLICATIONS

U.S. Appl. No. 12/877,884, filed Sep. 8, 2010, Winter et al.

(Continued)

*Primary Examiner* — Stephen J. Kalafut
(74) *Attorney, Agent, or Firm* — The Marbury Law Group PLLC

(57) ABSTRACT

An electrochemical flow cell includes a permeable electrode, an impermeable electrode located adjacent to and spaced apart from the permeable electrode and a reaction zone electrolyte flow channel located between a first side of the permeable electrode and a first side of the impermeable electrode. The electrochemical flow cell also includes at least one electrolyte flow channel located adjacent to a second side of the permeable electrode, at least one central electrolyte flow conduit extending through a central portion of the permeable electrode and through a central portion of the impermeable electrode and at least one peripheral electrolyte flow inlet/outlet located in a peripheral portion of the electrochemical cell above or below the permeable electrode.

36 Claims, 15 Drawing Sheets

U.S. PATENT DOCUMENTS

| | | | |
|---|---|---|---|
| 4,162,351 A | 7/1979 | Putt et al. |
| 4,200,684 A | 4/1980 | Bro |
| 4,257,867 A | 3/1981 | Hammond et al. |
| 4,273,839 A | 6/1981 | Carr et al. |
| 4,287,267 A | 9/1981 | Whittlesey et al. |
| 4,306,003 A | 12/1981 | Henriksen |
| 4,307,159 A | 12/1981 | Hammond et al. |
| 4,320,179 A | 3/1982 | Hart |
| 4,371,825 A | 2/1983 | Chi et al. |
| 4,413,042 A | 11/1983 | Carr |
| 4,414,292 A | 11/1983 | Kiwalle et al. |
| 4,415,847 A | 11/1983 | Galloway |
| 4,518,663 A | 5/1985 | Kodali et al. |
| 4,518,664 A | 5/1985 | Whittlesey et al. |
| 4,534,833 A | 8/1985 | Carr et al. |
| 4,567,120 A | 1/1986 | Jorne et al. |
| 4,678,656 A | 7/1987 | Bjorkman, Jr. et al. |
| 4,728,587 A | 3/1988 | Horie et al. |
| 4,746,585 A | 5/1988 | Stoner et al. |
| 8,039,161 B2 * | 10/2011 | Winter | 429/447 |
| 2004/0234843 A1 | 11/2004 | Skyllas-Kazacos |
| 2005/0181273 A1 | 8/2005 | Deguchi et al. |
| 2005/0244707 A1 | 11/2005 | Skyllas-Kazacos |
| 2009/0239131 A1 | 9/2009 | Winter |
| 2010/0021805 A1 | 1/2010 | Winter |
| 2010/0119937 A1 | 5/2010 | Winter |
| 2011/0070468 A9 | 3/2011 | Winter |

OTHER PUBLICATIONS

Symons, Philip C., "Advanced Technology Zinc/Chlorine Batteries for Electric Utility Load Leveling," 19$^{th}$ Intersociety Energy Conversion Engineering Conf., 1984, vol. 2, 857-862.

EPRI Report, EM-101 (parts 1-3), Apr. 1979, Electric Power Research Institute.

International Search Report and Written Opinion issued in PCT Application PCT/US2011/050089, mailed on Apr. 9, 2012.

* cited by examiner

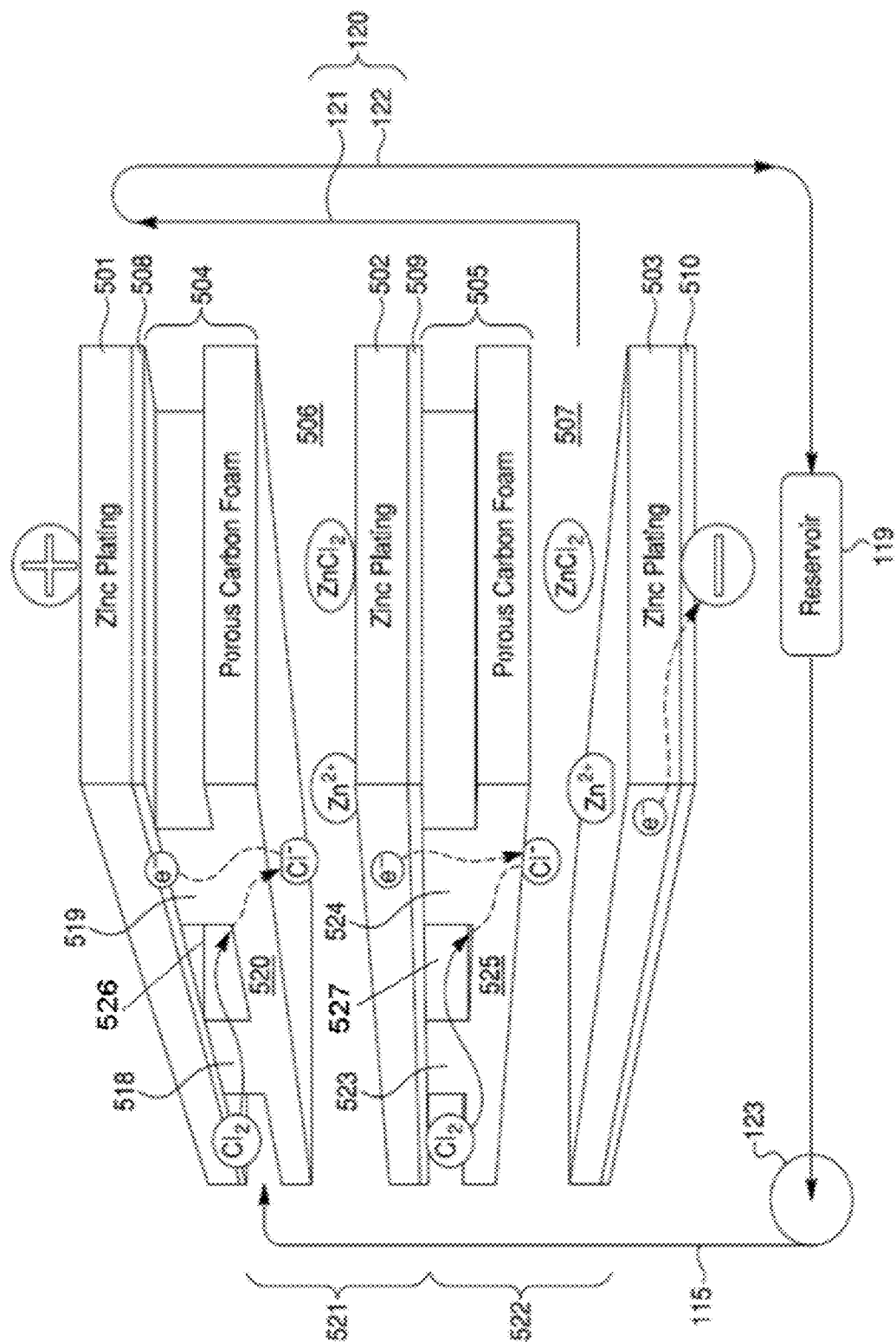

FLOW BATTER WITH RADIAL ELECTROLYTE DISTRIBUTION

FIELD

The present invention is directed to electrochemical systems and methods of using same.

BACKGROUND

The development of renewable energy sources has revitalized the need for large-scale batteries for off-peak energy storage. The requirements for such an application differ from those of other types of rechargeable batteries such as lead-acid batteries. Batteries for off-peak energy storage in the power grid generally are required to be of low capital cost, long cycle life, high efficiency, and low maintenance.

One type of electrochemical energy system suitable for such an energy storage is a so-called "flow battery" which uses a halogen component for reduction at a normally positive electrode, and an oxidizable metal adapted to become oxidized at a normally negative electrode during the normal operation of the electrochemical system. An aqueous metal halide electrolyte is used to replenish the supply of halogen component as it becomes reduced at the positive electrode. The electrolyte is circulated between the electrode area and a reservoir area. One example of such a system uses zinc as the metal and chlorine as the halogen.

Such electrochemical energy systems are described in, for example, U.S. Pat. No. 3,713,888, 3,993,502, 4,001,036, 4,072,540, 4,146,680, and 4,414,292, and in EPRI Report EM-I051 (Parts 1-3) dated April 1979, published by the Electric Power Research Institute, the disclosures of which are hereby incorporated by reference in their entirety.

SUMMARY

An embodiment relates to an electrochemical flow cell. The electrochemical flow cell includes a permeable electrode, an impermeable electrode located adjacent to and spaced apart from the permeable electrode and a reaction zone electrolyte flow channel located between a first side of the permeable electrode and a first side of the impermeable electrode. The electrochemical flow cell also includes at least one electrolyte flow channel located adjacent to a second side of the permeable electrode, at least one central electrolyte flow conduit extending through a central portion of the permeable electrode and through a central portion of the impermeable electrode and at least one peripheral electrolyte flow inlet/outlet located in a peripheral portion of the electrochemical cell above or below the permeable electrode.

Another embodiment relates to a flow battery having a pressure vessel and a stack of electrochemical flow cells located in the pressure vessel. The flow battery also includes a reservoir located in the pressure vessel, the reservoir configured to accumulate a metal halide electrolyte component and a liquefied halogen reactant and a flow circuit located in the pressure vessel, the flow circuit configured to deliver the halogen reactant and the metal halide electrolyte between the reservoir and the stack of electrochemical cells.

Yet another embodiment relates to a method of operating a flow battery comprising of a stack of electrochemical flow cells. The method includes providing a radial flow of a metal halide electrolyte component and a liquefied halogen reactant between at least one peripheral inlet located in a peripheral portion of a reaction zone electrolyte flow channel of at least one cell in the stack and at least one central outlet located in a central portion between adjacent cells in the stack.

BRIEF DESCRIPTION OF THE DRAWINGS

FIG. 5a schematically illustrates a three dimensional view of flow paths in the electrochemical system with downward flow in a discharge mode.

FIG. 9b is a cutaway view of the radial flow cell of FIG. 9a.

FIG. 9c illustrates a side cross sectional view of the radial flow cell of FIG. 9a.

FIG. 9d illustrates a lip and insulating spacers of the cell frame of FIG. 9a.

DETAILED DESCRIPTION

The following documents, the disclosures of which are incorporated herein by reference in their entirety, can be useful for understanding and practicing the embodiments described herein: U.S. patent application Ser. No. 12/523, 146, which is a U.S. National Phase entry of PCT application no. PCT/US2008/051111 filed Jan. 11, 2008, which claims benefit of priority to U.S. patent application Ser. No. 11/654, 380 filed Jan. 16, 2007.

The embodiments disclosed herein relate to an electrochemical system (also sometimes referred to as a "flow battery"). The electrochemical system can utilize a metal-halide electrolyte and a halogen reactant, such as molecular chlorine. The halide in the metal-halide electrolyte and the halogen reactant can be of the same type. For example, when the halogen reactant is molecular chlorine, the metal halide electrolyte can contain at least one metal chloride.

The electrochemical system can include a sealed vessel containing an electrochemical cell in its inner volume, a metal-halide electrolyte and a halogen reactant, and a flow circuit configured to deliver the metal-halide electrolyte and the halogen reactant to the electrochemical cell. The sealed vessel can be a pressure vessel that contains the electrochemical cell. The halogen reactant can be, for example, a molecular chlorine reactant.

Figure 4:
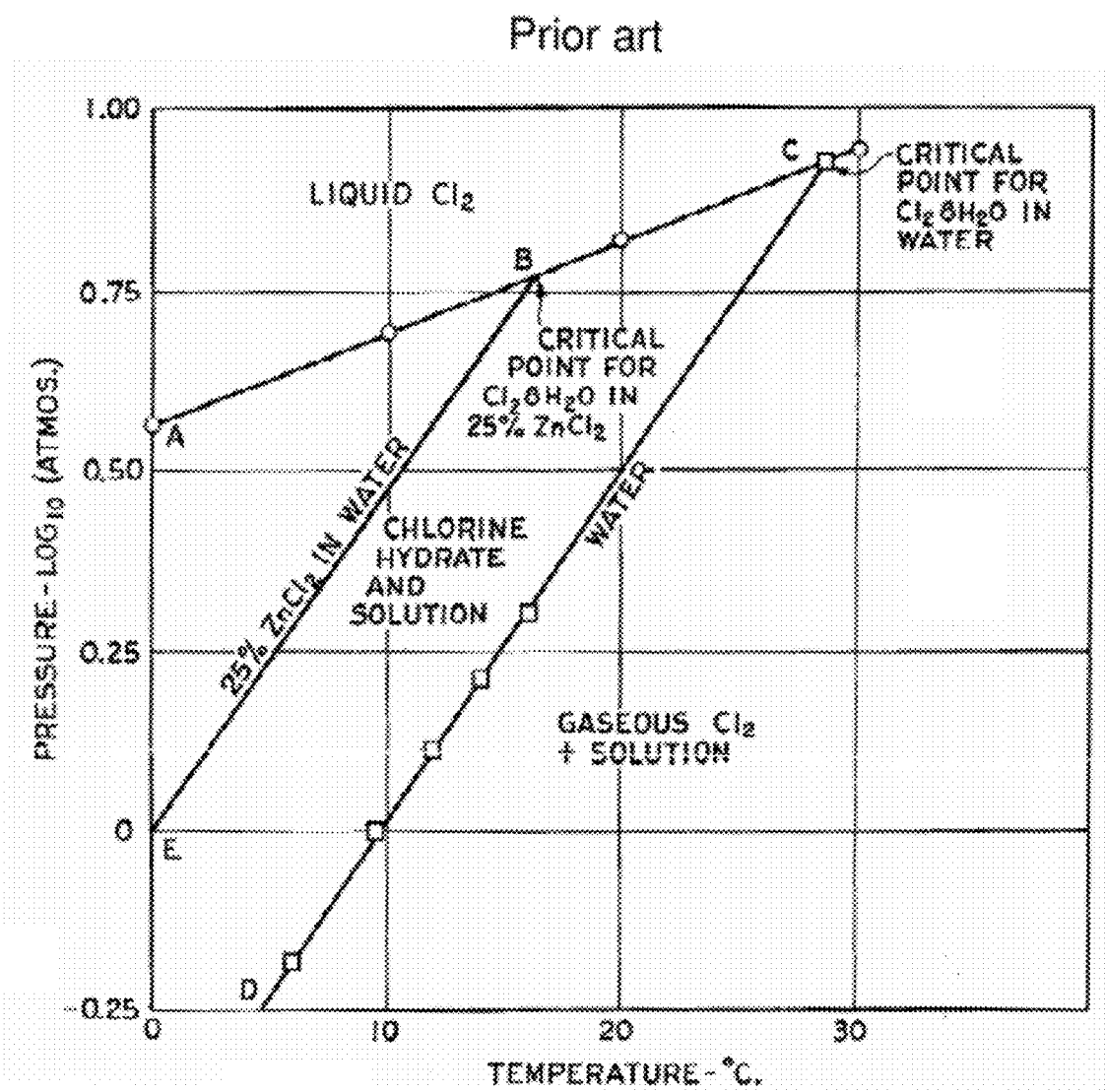
FIG. 4 is a prior art phase diagram for a molecular chlorine as presented in U.S. Pat. No. 3,940,283.

In many embodiments, the halogen reactant may be used in a liquefied form. The sealed vessel is such that it can maintain an inside pressure above a liquefaction pressure for the halogen reactant at a given ambient temperature. A liquefication pressure for a particular halogen reactant for a given temperature may be determined from a phase diagram for the halogen reactant. For example, FIG. 4 presents a phase diagram for elemental chlorine, from which a liquefication pressure for a given temperature may be determined. The system that utilizes the liquefied halogen reactant in the sealed container does not require a compressor, while compressors are often used in other electrochemical systems for compression of gaseous halogen reactants. The system that utilizes the liquefied halogen reactant does not require a separate storage for the halogen reactant, which can be located outside the inner volume of the sealed vessel. The term "liquefied halogen reactant" refers to at least one of molecular halogen dissolved in water, which is also known as wet halogen or aqueous halogen, and "dry" liquid molecular halogen, which is not dissolved in water. Similarly, the term "liquefied chlorine" may refer to at least one of molecular chlorine dissolved in water, which is also known as wet chlorine or aqueous chlorine, and "dry" liquid chlorine, which is not dissolved in water.

In many embodiments, the system utilizes a liquefied molecular chlorine as a halogen reactant. The liquefied molecular chlorine has a gravity which is approximately two times greater than that of water.

The flow circuit contained in the sealed container may be a closed loop circuit that is configured to deliver the halogen reactant, preferably in the liquefied or liquid state, and the at least one electrolyte to and from the cell(s). In many embodiments, the loop circuit may be a sealed loop circuit. Although the components, such as the halogen reactant and the metal halide electrolyte, circulated through the closed loop are preferably in a liquefied state, the closed loop may contain therein some amount of gas, such as chlorine gas.

Preferably, the loop circuit is such that the metal halide electrolyte and the halogen reactant circulate through the same flow path without a separation in the cell(s).

Each of the electrochemical cell(s) may comprise a first electrode, which may serve as a positive electrode in a normal discharge mode, and a second electrode, which may serve as a negative electrode in a normal discharge mode, and a reaction zone between the electrodes.

In many embodiments, the reaction zone may be such that no separation of the halogen reactant, such as the halogen reactant or ionized halogen reactant dissolved in water of the electrolyte solution, occurs in the reaction zone. For example, when the halogen reactant is a liquefied chlorine reactant, the reaction zone can be such that no separation of the chlorine reactant, such as the chlorine reactant or chlorine ions dissolved in water of the electrolyte solution, occurs in the reaction zone. The reaction zone may be such that it does not contain a membrane or a separator between the positive and negative electrodes of the same cell that is impermeable to the halogen reactant, such as the halogen reactant or ionized halogen reactant dissolved in water of the electrolyte solution. For example, the reaction zone may be such that it does not contain a membrane or a separator between the positive and negative electrodes of the same cell that is impermeable to the liquefied chlorine reactant, such as the chlorine reactant or chlorine ions dissolved in water of the electrolyte solution.

In many embodiments, the reaction zone may be such that no separation of halogen ions, such as halogen ions formed by reducing the halogen reactant at one of the electrodes, from the rest of the flow occurs in the reaction zone. In other words, the reaction zone may be such that it does not contain a membrane or a separator between the positive and negative electrodes of the same cell that is impermeable for the halogen ions, such as chlorine ions. Furthermore, the cell may be a hybrid flow battery cell rather than a redox flow battery cell. Thus, in the hybrid flow battery cell, a metal, such as zinc is plated onto one of the electrodes, the reaction zone lacks an ion exchange membrane which allows ions to pass through it (i.e., there is no ion exchange membrane between the cathode and anode electrodes) and the electrolyte is not separated into a catholyte and anolyte by the ion exchange membrane.

In certain embodiments, the first electrode may be a porous electrode or contain at least one porous element. For example, the first electrode may comprise a porous carbonaceous material such as a porous carbon foam. In a discharge mode, the first electrode may serve as a positive electrode, at which the halogen may be reduced into halogen ions. The use of the porous material in the first electrode may increase efficiency of the halogen reactant's reduction.

In many embodiments, the second electrode may comprise an oxidizable metal, i.e., a metal that may be oxidized to form cations during the discharge mode. In many embodiments, the second electrode may comprise a metal that is of the same type as a metal ion in one of the components of the metal halide electrolyte. For example, when the metal halide electrolyte comprises zinc halide, such as zinc chloride, the second electrode may comprise metallic zinc. Alternatively, the electrode may comprise another material, such as ruthenized titanium (i.e., ruthenium coated titanium, where the ruthenium is oxidized to form ruthenium oxide) that is plated with zinc. In such a case, the electrochemical system may function as a reversible system.

Thus, in some embodiments, the electrochemical system may be reversible, i.e. capable of working in both charge and discharge operation mode; or non-reversible, i.e. capable of working only in a discharge operation mode. The reversible electrochemical system usually utilizes at least one metal halide in the electrolyte, such that the metal of the metal halide is sufficiently strong and stable in its reduced form to be able to form an electrode. The metal halides that can be used in the reversible system include zinc halides, as element zinc is sufficiently stable to be able to form an electrode. On the other hand, the non-reversible electrochemical system does not utilize the metal halides that satisfy the above requirements. Metals of metal halides that are used in the non-reversible systems are usually unstable and strong in their reduced, elemental form to be able to form an electrode. Examples of such unstable metals and their corresponding metal halides include potassium (K) and potassium halides and sodium (Na) and sodium halides.

The metal halide electrolyte can be an aqueous electrolytic solution. The electrolyte may be an aqueous solution of at least one metal halide electrolyte compound, such as ZnCl. For example, the solution may be a 15-50% aqueous solution of ZnCl, such as a 25% solution of ZnCl. In certain embodiments, the electrolyte may contain one or more additives, which can enhance the electrical conductivity of the electrolytic solution. For example, when the electrolyte contains ZnCl, such additive can be one or more salts of sodium or potassium, such as NaCl or KCl.

Figure 1:
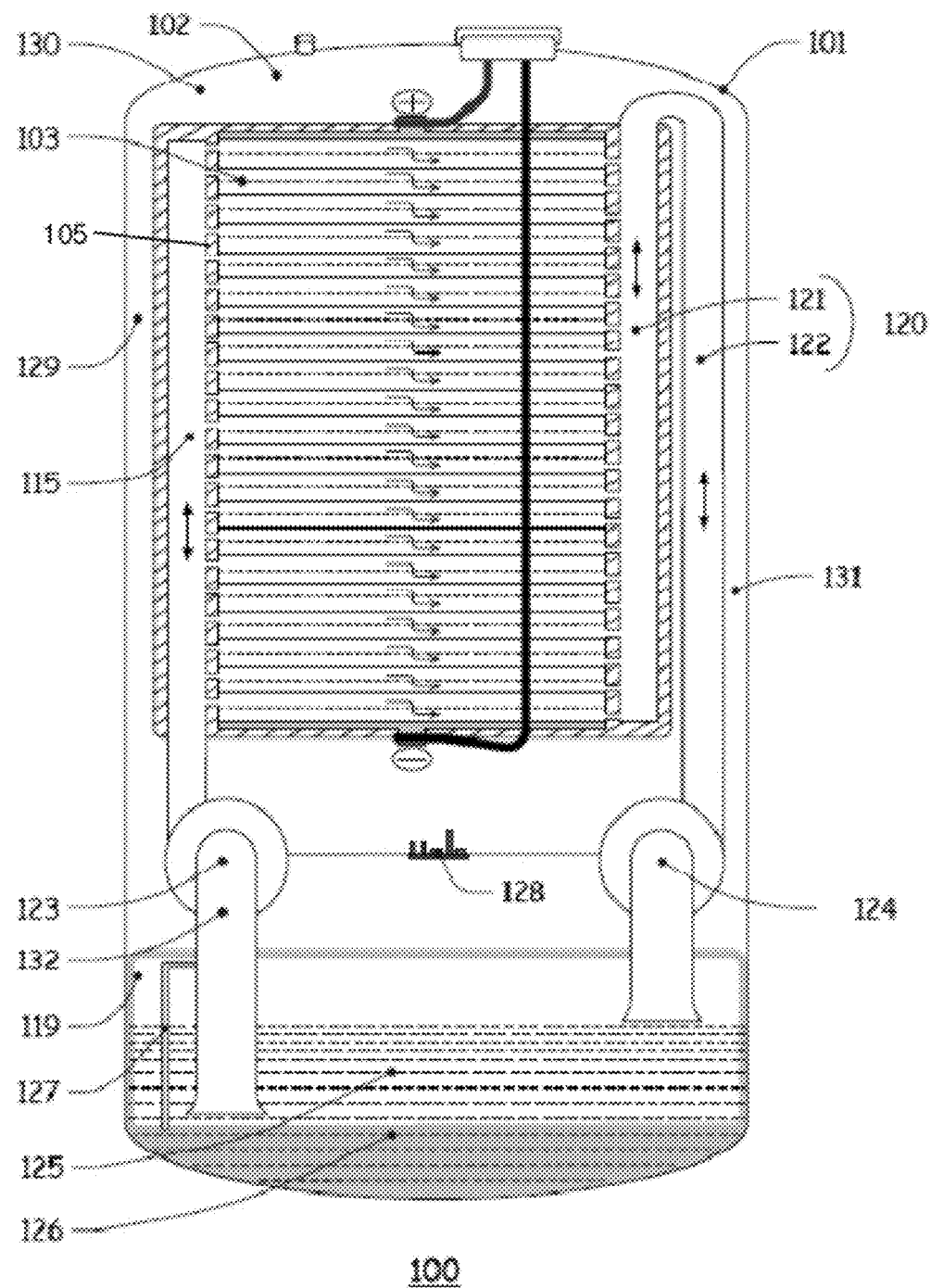
FIG. 1 illustrates a side cross section view of an embodiment of the electrochemical system with a sealed container containing a stack of electrochemical cells.

FIG. 1 illustrates an electrochemical system 100 which includes at least one electrochemical flow cell 105, an electrolyte and a halogen reactant contained in a sealed container 101. The sealed container 101 is preferably a pressure containment vessel, which is configured to maintain a pressure above one atmospheric pressure in its inner volume 102. Preferably, the sealed container 101 is configured to maintain a pressure in its inner volume above the liquefication pressure for the halogen reactant, such as elemental chlorine. For functioning at a normal temperature such as 10-40° C., the sealed container may be configured to maintain an inside pressure of at least 75 psi or of at least 100 psi or of at least 125 psi or of at least 150 psi or of at least 175 psi or of at least 200 psi or of at least 250 psi or of at least 300 psi or of at least 350 psi or of at least 400 psi or of at least 450 psi or of at least 500 psi or of at least 550 psi or of at least 600 psi, such as 75-650 psi or 75-400 psi and all subranges described previously. The walls of the sealed container may be composed of a structural material capable to withstand the required pressure. One non-limiting example of such a material is stainless steel.

The at least one electrochemical flow cell 105 contained inside the sealed container 101 is preferably a horizontally positioned cell, which may include a horizontal positive electrode and horizontal negative electrode separated by a gap. The horizontally positioned flow cell 105 may be advantageous because when the circulation of the liquid stops due to, for example, turning off a discharge or a charge pump, some amount of liquid (the electrolyte and/or the halogen reactant) may remain in the reaction zone of the flow cell 105. The amount of the liquid may be such that it provides electrical contact between the positive and negative electrodes of the same flow cell 105. The presence of the liquid in the reaction zone may allow a faster restart of the electrochemical system when the circulation of the metal halide electrolyte and the halogen reagent is restored compared to systems that utilize a vertically positioned flow cell(s) 105, while providing for shunt interruption. The presence of the electrolyte in the reaction zone may allow for the flow cell 105 to hold a charge in the absence of the circulation and thus, ensure that the system provides uninterrupted power supply (UPS). The horizontally positioned flow cell(s) 105 in a combination with a liquefied chlorine reactant used as a halogen reactant may also prevent or reduce a formation of chlorine bubbles during the operation.

In many embodiments, the sealed container may contain more than one electrochemical flow cell 105. In certain embodiments, the sealed container may contain a plurality of electrochemical flow cells 105, which may be connected in series. In some embodiments, the plurality of electrochemical flow cells 105 that are connected in series may be arranged in a stack. For example, element 103 in FIG. 1 represents a vertical stack of horizontally positioned electrochemical flow cells 105, which are connected in series. The stack of horizontally positioned flow cells 105 may be similar to the one disclosed on pages 7-11 and FIGS. 1-3 of WO2008/089205, which is incorporated herein by reference in its entirety. The advantages of a single horizontally positioned flow cell 105 apply to the stack as well.

The electrochemical system can include a feed pipe or manifold that may be configured in a normal discharge operation mode to deliver a mixture comprising the metal-halide electrolyte and the liquefied halogen reactant to the at least one flow cell 105. The electrochemical system may also include a return pipe or manifold that may be configured in the discharge mode to collect products of an electrochemical reaction from the at least one electrochemical flow cell 105. Such products may be a mixture comprising the metal-halide electrolyte and/or the liquefied halogen reactant, although the concentration of the halogen reactant in the mixture may be reduced compared to the mixture entering the flow cell 105 due to the consumption of the halogen reactant in the discharge mode.

For example, in FIG. 1 a feed pipe or manifold 115 is configured to deliver a mixture comprising the metal-halide electrolyte and the liquefied halogen reactant to the horizontally positioned flow cells 105 of the stack 103. A return pipe or manifold 120 is configured to collect products of an electrochemical reaction from flow cells 105 of the stack 103. As will be further discussed, in some embodiments, the feed pipe or manifold and/or the return pipe or manifold may be a part of a stack assembly for the stack of the horizontally positioned flow cells 105. In some embodiments, the stack 103 may be supported directly by walls of the vessel 101. Yet in some embodiments, the stack 103 may be supported by one or more pipes, pillars or strings connected to walls of the vessel 101 and/or reservoir 119.

The feed pipe or manifold and the return pipe or manifold may be connected to a reservoir 119 that may contain the liquefied, e.g. liquid, halogen reactant and/or the metal halide reactant. Such a reservoir may be located within the sealed container 101. The reservoir, the feed pipe or manifold, the return pipe or manifold and the at least one flow cell 105 may form a loop circuit for circulating the metal-halide electrolyte and the liquefied halogen reactant.

The metal-halide electrolyte and the liquefied halogen reactant may flow through the loop circuit in opposite directions in charge and discharge modes. In the discharge mode, the feed pipe or manifold 115 may be used for delivering the metal-halide electrolyte and the liquefied halogen reactant to the at least one flow cell 105 from the reservoir 119 and the return pipe or manifold 120 for delivering the metal-halide electrolyte and the liquefied halogen reactant from the at least one flow cell 105 back to the reservoir. In the charge mode, the return pipe or manifold 120 may be used for delivering the metal-halide electrolyte and/or the liquefied halogen reactant to the at least one flow cell 105 from the reservoir 119 and the feed pipe or manifold 115 for delivering the metal-halide electrolyte and/or the liquefied halogen reactant from the at least one flow cell 105 back to the reservoir 119.

In some embodiments, when the system utilizes a vertical stack 103 of horizontally positioned flow cells 105, the return pipe or manifold 120 may be an upward-flowing return pipe or manifold. The pipe 120 includes an upward running section 121 and a downward running section 122. The flow of the metal-halide electrolyte and the liquefied halogen electrolyte leaves the flow cells 105 of the stack 103 in the discharge mode upward through the section 121 and then goes downward to the reservoir through the section 122. The upward flowing return pipe or manifold may prevent the flow from going mostly through the bottom flow cell 105 of the stack 103, thereby, providing a more uniform flow path resistance between the flow cells 105 of the stack.

The electrochemical system may include one or more pumps for pumping the metal-halide electrolyte and the liquefied halogen reactant. Such a pump may or may not be located within the inner volume of the sealed vessel. For example, FIG. 1 shows discharge pump 123, which fluidly connects the reservoir 119 and the feed pipe or manifold 115 and which is configured to deliver the metal-halide electrolyte and the liquefied halogen reactant through the feed pipe or manifold 115 to the electrochemical flow cell(s) 105 in the discharge mode. In some embodiments, the electrochemical generation system may include charge pump depicted as element 124 in FIG. 1. The charge pump fluidly connects the return pipe or manifold 120 to the reservoir 119 and can be used to deliver the metal-halide electrolyte and the liquefied halogen reactant through the return pipe or manifold to the electrochemical flow cell(s) 105 in the charge mode. In some embodiments, the electrochemical system may include both charge and discharge pumps. The charge and discharge pumps may be configured to pump the metal-halide electrolyte and the liquefied halogen reactant in the opposite directions through the loop circuit that includes the feed pipe or manifold and the return pump or manifold. Preferably, the charge and discharge pumps are configured in such a way so that only one pump operates at a given time. Such an arrangement may improve the reliability of the system and increase the lifetime of the system. The opposite pump arrangement may also allow one not to use in the system a valve for switching between the charge and discharge modes. Such a switch valve may often cost more than an additional pump. Thus, the opposite pump arrangement may reduce the overall cost of the system.

Pumps that are used in the system may be centripetal pumps. In some embodiments, it may be preferred to use a pump that is capable to provide a pumping rate of at least 30 L/min.

FIG. 1 depicts the reservoir as element 119. The reservoir 119 may be made of a material that is inert to the halogen reactant. One non-limiting example of such an inert material may be a polymer material, such as polyvinyl chloride (PVC). The reservoir 119 may also store the metal halide electrolyte. In such a case, if the liquefied chlorine is used as a liquefied halogen reactant, then the chlorine can be separated from the metal halide electrolyte due to a higher density (specific gravity) of the former, and/or by a separation device as described below with respect to FIGS. 7 and 8. FIG. 1 shows liquefied chlorine at the lower part of the reservoir (element 126) and the metal-halide electrolyte being above the liquefied chlorine in the reservoir (element 125).

The reservoir 119 may contain a feed line for the liquefied halogen reactant, which may supply the halogen reactant 126 to the feed pipe or manifold 115 of the system. A connection between the halogen reactant feed line and the feed manifold of the system may occur before, at or after a discharge pump 123. In some embodiments, the connection between the halogen reactant feed line and the feed manifold of the system may comprise a mixing venturi. FIG. 1 presents the feed line for the liquefied halogen reactant as element 127. An inlet of the feed line 127, such as a pipe or conduit, may extend to the lower part 126 of the reservoir 119, where the liquefied halogen reactant, such as the liquefied chlorine reactant, may be stored. An outlet of the feed line 127 is connected to an inlet of the discharge pump 123. The electrolyte intake feed line, such as a pipe or conduit 132, may extend to the upper part 125, where the metal-halide electrolyte is located.

In some embodiments, the reservoir 119 may include one or more sump plates, which may be, for example, a horizontal plate with holes in it. The sump plate may facilitate the settling down of the liquefied halogen reactant, such as liquefied chlorine reactant, at the lower part 126 of the reservoir, when the liquefied halogen reactant returns to the reservoir 119, for example, from the return pipe or manifold 120 in the discharge mode. The reservoir 119 is preferably but not necessarily located below the stack 103 of flow cells 105.

In some embodiments, the reservoir 119 may include one or more baffle plates. Such baffle plates may be vertical plates located at the top and bottom of the reservoir. The baffle plates may reduce and/or prevent eddy currents in the returning flow of the metal-halide electrolyte and the liquefied halogen reactant, thereby enhancing the separation of the liquefied halogen from the metal-halide electrolyte in the reservoir.

In certain embodiments, the discharge pump may be positioned with respect to the reservoir so that it's inlet/outlet is located below the upper level of the metal-halide electrolyte in the reservoir. In certain embodiments, the inlet/outlet of the discharge pump may be positioned horizontally or essentially horizontally. In such an arrangement, the flow of the metal-halide electrolyte and the liquefied halogen reactant may make a 90 degree turn in the discharge pump from a horizontal direction in the inlet to a vertical direction in the feed manifold or pipe 115. In some embodiments, the inlet of the discharge pump 123 may include a bellmouth piece, which may slow down the flow and thereby prevent/reduce formation of turbulence in the reservoir.

The charge pump may also be positioned with it's inlet/outlet located below the upper level of the metal-halide electrolyte in the reservoir. In certain embodiments, the inlet/outlet of the charge pump may be located at a lower level than the inlet/outlet of the discharge pump. The inlet/outlet of the charge pump may also have a bellmouth piece, which may slow down the flow and thereby prevent/reduce formation of turbulence in the reservoir.

Figure 6:
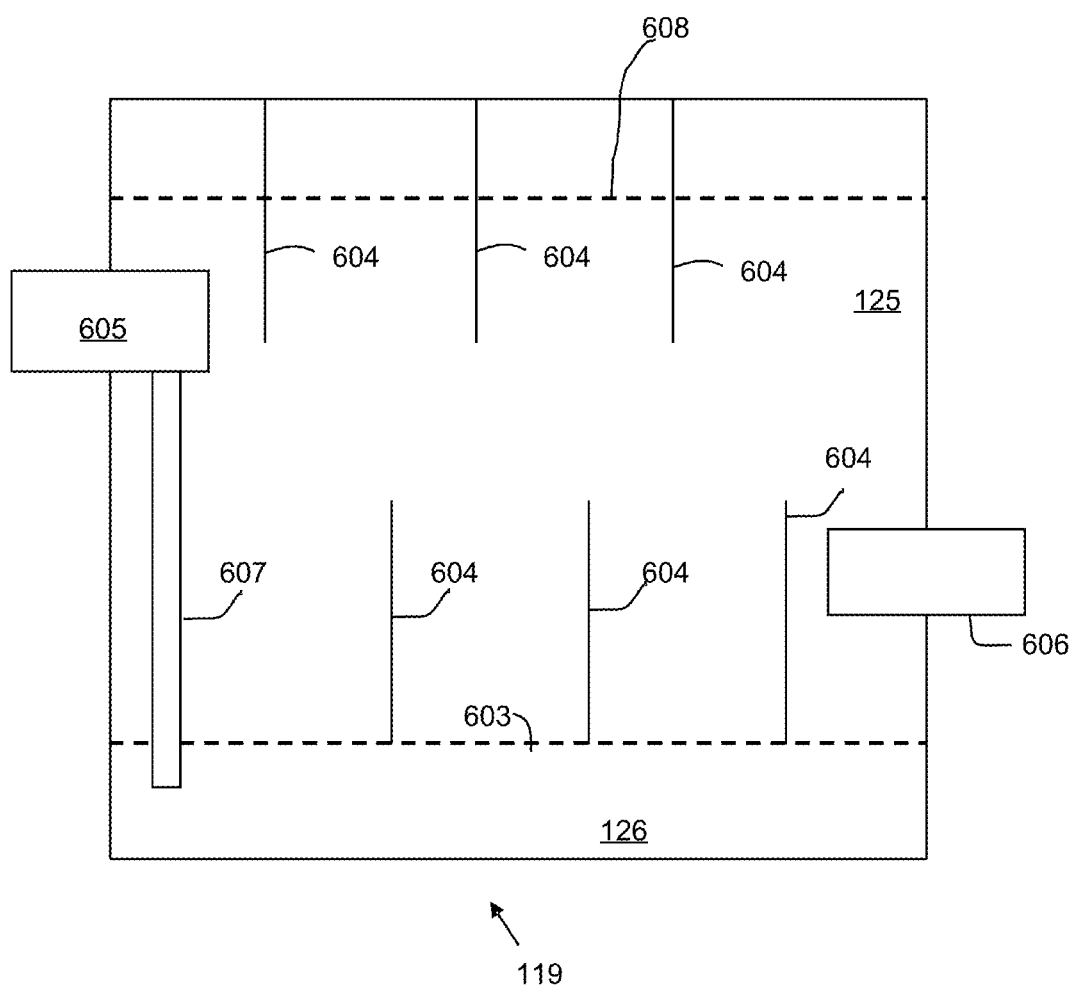
FIG. 6 schematically illustrates a side cross-sectional view of a reservoir which has a sump plate separation device and baffle plates.

FIG. 6 illustrates the reservoir 119 which has a lower part 126, which may contain the liquefied halogen reactant, such as a liquefied molecular chlorine reactant; an upper part 125, which may contain the metal halide reactant; a horizontal sump plate 603, vertical baffle plates 604, a horizontal inlet 605 of a discharge pump, a horizontal outlet 606 of a charge pump and a feed line 607 for the liquefied halogen reactant, which has an inlet in the lower part 126 of the reservoir and which is connected to the discharge pump's inlet 605. The sump plate 603 is positioned approximately at the level where the boundary between the metal-halide electrolyte and the halogen reactant is expected to be located. Line 608 schematically depicts the upper level of the metal-halide electrolyte in the reservoir. Discharge pump's inlet 605 and charge pump's outlet 606 may protrude through the walls of the reservoir.

In some embodiments, the electrochemical system may include a controlling element, which may be used, for example, for controlling a rate of the discharge pump, a rate of the charge pump and/or a rate of feeding the halogen reactant into the electrolyte. Such a controlling element may be an analog circuit. FIG. 1 depicts the controlling element as element 128, which may control one or more of the following parameters: rates of the charge pump 124 and the discharge pump 123 and a feed rate of the liquefied chlorine reactant through the feed line 127.

The inner volume of the sealed container may have several pressurized zones, each having a different pressure. For example, the inner volume may include a first zone, and a second zone having a pressure higher than that of the first zone. In some embodiments, the first zone may be enveloped or surrounded by the second, higher pressure zone. The first zone may contain the electrolyte/liquefied halogen reactant loop, i.e. the reservoir 119, the flow cell(s) 105, pump(s) 123 and 124, manifold(s) 115, 120, while the second surrounding or enveloping zone may be a space between the first zone and the walls of the sealed vessel 101. In FIG. 1, the flow cells 105, the feed manifold or pipe 115, the reservoir 119, including the metal halide reactant in the upper part 125 of the reservoir and the liquefied halogen reactant in its lower part 126, and the return manifold or pipe 120 all may be in the first pressure zone, while the higher pressure second zone may be represented by the areas 129, 130 and 131 of the inner volume of the vessel 101.

In such an arrangement, a pressure in the first zone may be a pressure sufficient to liquefy the halogen reactant at a given temperature. Such a pressure may be at least 75 psi or at least 100 psi or at least 125 psi or at least 150 psi or at least 175 psi or at least 200 psi or at least 250 psi or at least 300 psi or at least 350 psi or at least 400 psi, such as 75-450 psi or 75-400 psi and all subranges in between. At the same time, a surrounding pressure in the second pressure zone may be higher than a maximum operating pressure of the first zone. Such a surrounding pressure may be at least 75 psi or at least 100 psi or at least 125 psi or at least 150 psi or at least 175 psi or at least 200 psi or at least 250 psi or at least 300 psi or at least 350 psi or at least 400 psi or at least 450 psi or at least 500 psi or at least 550 psi or at least 600 psi, such as 75-650 psi or 200-650 psi or 400-650 psi and all the subranges in between.

The enveloped arrangement may provide a number of advantages. For example, in the event of a leak from the first zone/loop circuit, the higher pressure in the surrounding second zone may cause the leaking component(s) to flow inwards the first zone, instead of outwards. Also, the surrounding higher pressure zone may reduce/prevent fatigue crack propagation over components of the first zone/loop circuit, including components made of plastic, such as manifolds and walls of reservoir. The pressurized envelope arrangement may also allow using thinner outer wall(s) for the sealed container/vessel, which can, nevertheless, prevent deformation(s) that could negatively impact internal flow geometries for the metal-halide electrolyte and the liquefied halogen reactant. In the absence of the pressurizing second zone, thicker outer wall(s) may be required to prevent such deformation(s) due to an unsupported structure against expansive force of the internal higher pressure.

In certain embodiments, the outer walls of the sealed container/vessel may be formed by a cylindrical component and two circular end plates, one of which may be placed on the top of the cylindrical component and the other on the bottom in order to seal the vessel. The use of the pressurized envelope arrangement for such outer walls allows using thinner end plates, without exposing internal flow geometries for the metal-halide electrolyte and the liquefied halogen reactant compared to the case when the outer walls are exposed to the variable pressure generated during the operation of the system.

The second pressure zone may be filled with an inert gas, such as argon or nitrogen. In some embodiments, the second pressure zone may also contain an additional component that can neutralize a reagent, such as the halogen reactant, that is leaking from the first zone, and/or to heal walls of the first zone/loop circuit. Such an additional material may be, for example, a soda ash. Thus, spaces 129, 130 and 131 may be filled with soda ash.

The electrochemical system in a pressurized envelope arrangement may be fabricated as follows. First, a sealed loop circuit for the metal halide electrolyte and the liquefied halogen reagent may be fabricated. The sealed loop circuit can be such that it is capable to maintain an inner pressure above a liquefaction pressure of the liquefied halogen for a given temperature. The sealed loop circuit may include one or more of the following elements: one or more electrochemical flow cells 105, a reservoir for storing the metal-halide electrolyte and the liquefied halogen reactant; a feed manifold or pipe for delivering the metal-halide electrolyte and the liquefied halogen reactant from the reservoir to the one or more flow cells 105; a return manifold for delivering the metal-halide electrolyte and the liquefied halogen reactant from the one or more flow cells 105 back to the reservoir; and one or more pumps. After the loop circuit is fabricated, it may be placed inside a vessel or container, which may be later pressurized to a pressure, which is higher than a maximum operation pressure for a loop circuit, and sealed. The pressurization of the vessel may be performed by pumping in an inert gas, such as argon or nitrogen, and optionally, one or more additional components. When the walls of the vessel are formed by a cylindrical component and two end plates, the sealing procedure may include the end plates at the top and the bottom of the cylindrical component.

Figure 2:
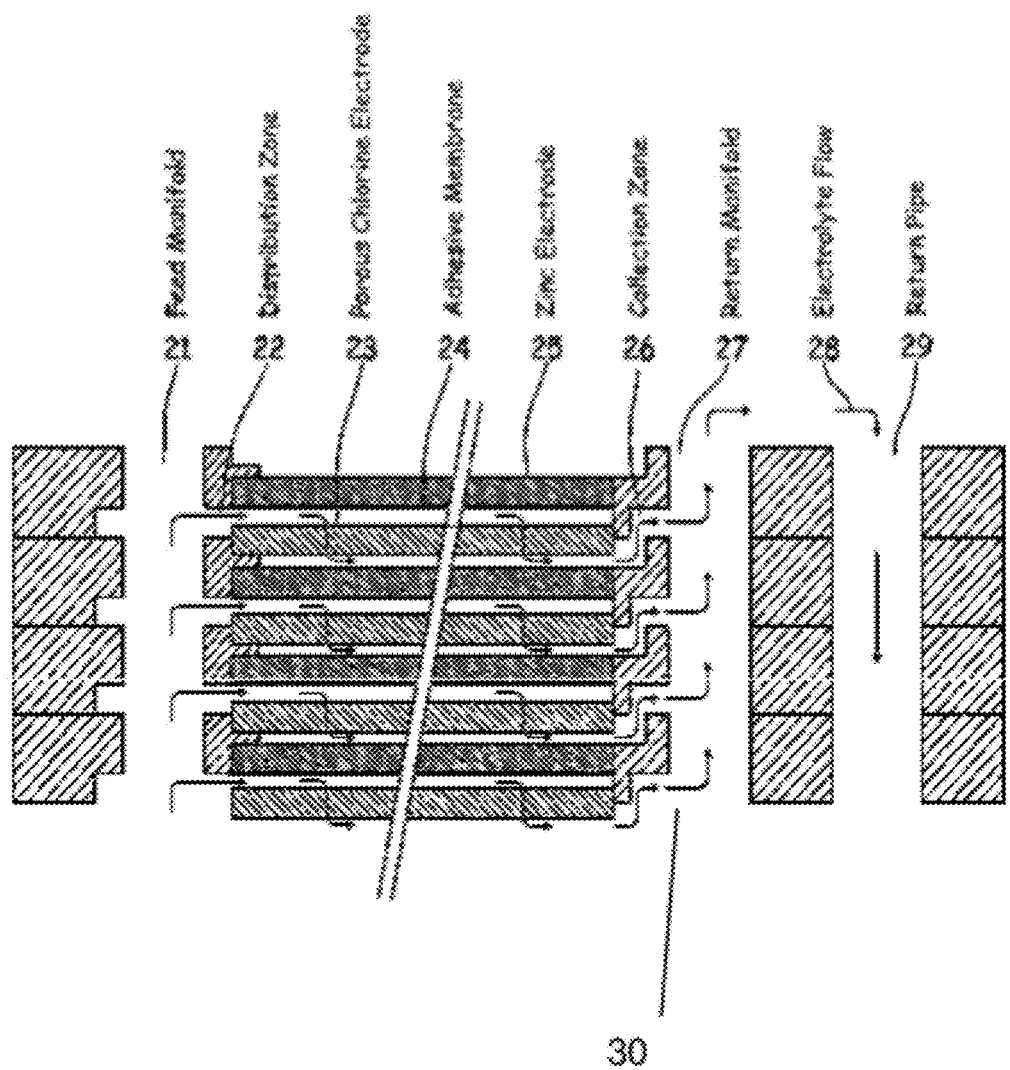
FIG. 2 illustrates a side cross section view of flow paths in a stack of horizontally positioned cells.

FIG. 2 illustrates paths for a flow of the metal-halide electrolyte and the liquefied halogen reactant through the horizontally positioned flow cells 105 of the stack 103, such as the stack 103 of FIG. 1, in the discharge mode. The electrolyte flow 28 paths in FIG. 2 are represented by arrows. For each of the flow cells 105 in the stack, the flow may proceed from a feed pipe or manifold 21 (element 115 in FIG. 1), into a distribution zone 22, through a porous "chlorine" electrode 23, over a metal electrode 25, which may comprise a substrate, which may be, for example, a titanium substrate or a ruthenized titanium substrate, and an oxidizable metal, which may be, for example, zinc, on the substrate, to a collection zone 26, through an upward return manifold 27 (element 121 in FIG. 1). The electrolyte flow 28 may proceed to a return pipe 29 (element 122 in FIG. 1).

In some embodiments, an element 24 may be placed on a bottom of metal electrode 25. Yet in some other embodiments, such an element may be omitted. The purpose of the element 24 may be to prevent the flow of the metal-halide electrolyte from contacting the active metal electrode, when passing through a porous electrode of an adjacent flow cell 105 located beneath. In other words, element 24 prevents the electrolyte from touching one side (e.g., the bottom side) of every metal electrode 25 so that the metal (e.g., zinc) plates only on the opposite side (e.g., the top side) of the metal electrode 25. In some cases, the element 24 may comprise the polymer or plastic material.

FIG. 2 also shows barriers 30. Each barrier 30 may be a part of a cell frame 301 discussed in a greater detail below. Barrier 30 may separate the positive electrode from the negative electrode of the same flow cell 105. Barriers 30 may comprise an electrically insulating material, which can be a polymeric material, such as poly vinyl chloride (PVC).

In the configuration depicted in FIG. 2, the metal-halide electrolyte may be forced to flow down through the porous electrode and then up to leave the flow cell 105. Such a down-and-up flow path may enable an electrical contact of the porous electrode and the metal electrode in each flow cell 105 with a pool of the metal halide electrolyte remaining in each flow cell 105 when the electrolyte flow stops and the feed manifold, distribution zone, collection zone, and return manifold drain. Such a contact may allow maintaining an electrical continuity in the stack 103 of flow cells 105 when the flow stops and may provide for an uninterrupted power supply (UPS) application without continuous pump operation. The down-and-up flow path within each flow cell 105 may also interrupt shunt currents that otherwise would occur when electrolyte flow stops. The shunt currents are not desired because they may lead to undesirable self-discharge of the energy stored in the system and an adverse non-uniform distribution of one or more active materials, such as an oxidizable metal, such as Zn, throughout the stack.

FIG. 5a further illustrates flow paths through the stacked flow cells 105 using $ZnCl_2$ as an exemplary metal-halide electrolyte and Cl2 as an exemplary halogen reactant. The stack in FIG. 5a includes a first cell 521, which has a reaction zone 506 between a positive electrode 504, e.g. porous carbon or permeable metal "chlorine" electrode, and a negative electrode 502, e.g. a zinc electrode, and a second cell 522, which has a reaction zone 507 between a positive electrode 505 and a negative electrode 503. The negative electrode 502 of the cell 522 is electrically connected to the positive electrode 505 of the cell 521, thereby providing electrical continuity between the cells of the stack. Each of the negative electrodes may comprise a conductive impermeable element, such as a titanium plate. Such element is shown as element 508 for electrode 501, element 509 for the electrode 502 and element 510 for the electrode 503.

FIG. 5a also shows an electrode 501 or a terminal plate positioned over the positive electrode 504 of the cell 521. When the cell 521 is the top terminal cell, the electrode 501 can be the terminal positive electrode of the stack. If the cell 521 is not the terminal cell, then the electrode 501 can be a negative electrode of an adjacent cell of the stack. The positive electrodes 504 and 505 are preferably porous electrodes, such as porous carbonaceous electrodes, such as carbon foam or permeable metal electrode.

The cells may be arranged in the stack in such a manner that a cell-to-cell distance may be significantly greater that a distance between positive and negative electrodes of a particular cell of the stack (an interelectrode distance). The interelectrode distance may be, for example, 0.5-5 mm such as 1-2 mm. In some embodiments, the cell-to-cell distance may be at least 3 times or at least 5 times or at least 8 times or at least 10 times, such as 3-15 times greater, than the interelectrode distance. The cell-to-cell distance may be defined as between two analogous surfaces in two adjacent cells. For example, the cell-to-cell distance may be a distance between an upper surface of the negative electrode 502 of the cell 521 and an upper surface of the negative electrode 503 of the cell 522. The cell-to-cell distance may be 5-20 mm, such as 10-15 mm. The distance between a particular cell's positive and negative electrodes in FIG. 5a is a distance between the lower surface of the positive electrode 504 of the cell 521 and the upper surface of the negative electrode 502 of the same cell.

To achieve the significant difference between the cell to cell distance and the interelectrode distance in a particular cell, at least one of positive or negative electrodes may comprise one or more electrically conductive spacers, which (i) increase the cell-to-cell distance compared to the interelectrode distance, (ii) provide an electrical contact between positive and negative electrodes of adjacent cells, and (iii) create flow channels in a flow path of the electrolyte.

Figure 9A:
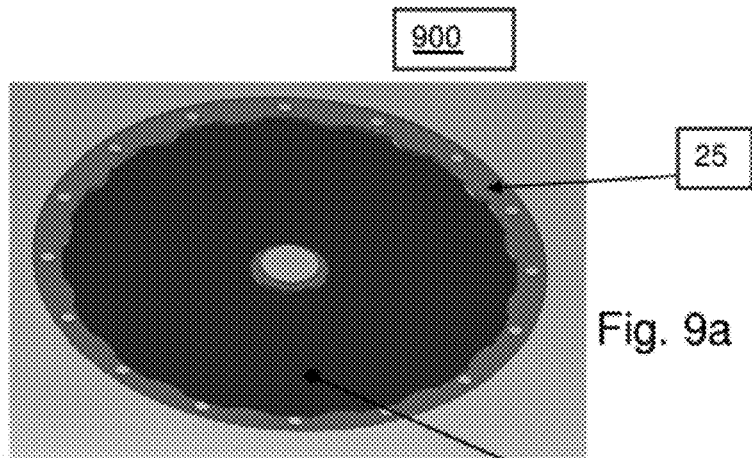
FIG. 9a is a perspective view illustrating an embodiment of a radial flow cell.
Figure 9B:
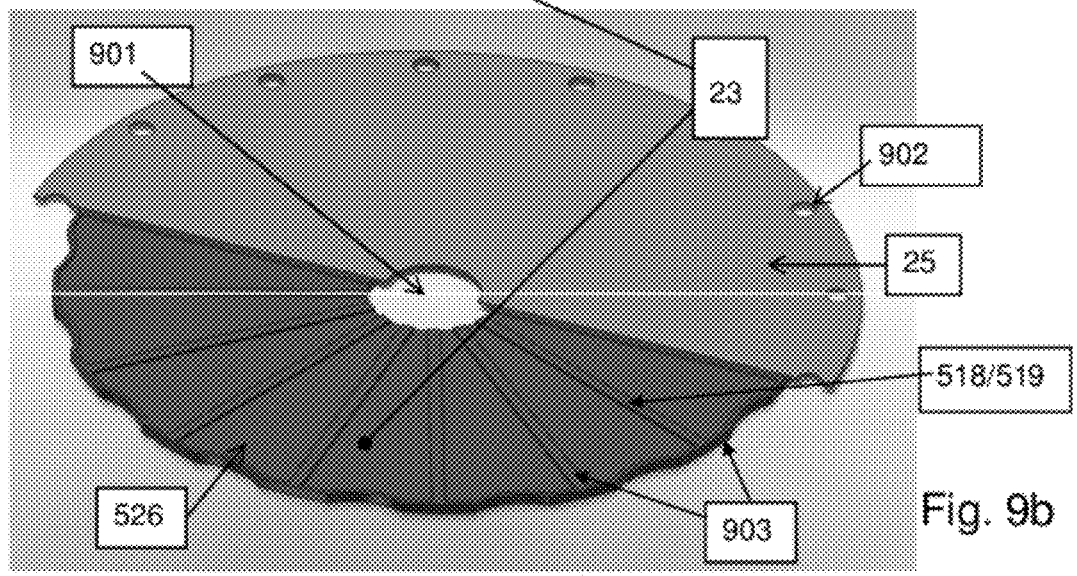
Figure 9C:
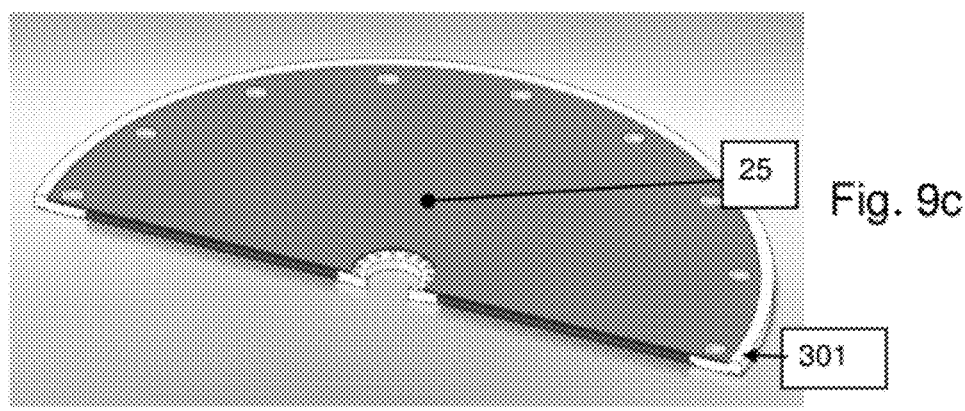

In FIG. 5a, the positive electrode 505 of the cell 522 has a porous part 525 and two conductive spacers 523 and 524, which are electrically connected to the negative electrode 502 of the adjacent cell 521. The conductive spacers 523 and 524 may or may not be made of a porous material. In certain embodiments, conductive spacers, such as spacers 523 and 524, may be made of carbonaceous material, such as graphite or non-permeable metal. Similarly to the electrode 505, the electrode 504 of the cell 521 contains a porous part 520 and two conductive spacers 518 and 519. An electrolyte flow path 526, 527 exists between adjacent anode and cathode electrodes of adjacent cells. The conductive spacers 518, 519 divide the flow path 526, 527 into flow channels as will be described below. The anode and cathode electrodes of the same cell are separated from each other by one or more insulating spacer(s) (shown in FIG. 9B as element 529) and/ or by the cell frame (element 301 shown in FIG. 3) to create a reaction zone 506, 507 flow path in each respective cell 521, 522.

In addition to the cells 521 and 522, FIG. 5a shows a reservoir 119; a feed line 115, which includes a pump 123; and a return manifold 120, which includes an upper running part 121 and a part 122, which is connected with the reservoir 119. Together the reservoir 119, the feed line 115, the return manifold 120, flow paths 526, 527 and the reaction zone 506, 507 flow paths form a closed loop (e.g. flow circle) for the metal halide electrolyte, which is illustrated as $ZnCl_2$ in FIG. 5a, and the halogen reactant ($Cl_2$ in FIG. 5a).

In the discharge mode, a mixture of the metal halide electrolyte and the liquefied halogen reactant arrives from the reservoir 119 in channel shaped flow paths 526, 527 between the spacers 518/519, 523, 524 at the top of a respective positive electrode of a cell, such as electrode 504 for cell 521 and the electrode 505 for the cell 522. The halogen reactant is reduced at the positive electrode. After the mixture penetrates through a porous part of the positive electrode (part 520 for the cell 521 and part 525 for the cell 522), it becomes enriched with halogen anions (Cl— in the case of molecular chlorine used as the halogen reactant).

The reaction zone of the cell, such as zone 506 for the cell 521 or zone 507 for the cell 522, is also a flow channel which does not contain a membrane or a separator configured to separate halogen anions, such as Cl—, from the metal halide electrolyte. Thus, from the positive electrode, the halogen anion enriched mixture proceeds down to the negative electrode, such as electrode 502 for the cell 521 and electrode 503 for the cell 522. In the discharge mode, a metal of the negative electrode is oxidized forming positive ions that are released into the halogen anion enriched mixture.

For example, if the negative electrode comprises metallic Zn as shown in FIG. 5a, the metallic zinc is oxidized into zinc ions, while releasing two electrons. The electrolyte mixture, which is enriched with both halogen anions and metal cations after contacting the negative electrode, leaves the cell through a path in the cell frame (as will be described with respect to FIG. 3) and the upper running return manifold and goes back to the reservoir, where the mixture can be resupplied with a new dose of the liquefied halogen reactant. In sum, in the system illustrated in FIG. 5a, the following chemical reactions can take place in the discharge mode:

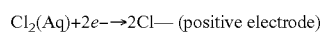

$Cl_2(Aq)+2e- \rightarrow 2Cl—$ (positive electrode)

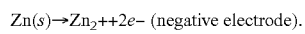

$Zn(s) \rightarrow Zn_2++2e-$ (negative electrode).

As the result of these reactions, 2.02 V per cell can be produced.

In the discharge mode, the electrochemical system can consume the halogen reactant and the metal constituting the negative electrode and produce an electrochemical potential. In the charge mode, the halogen reactant and the metal of the electrode may be replenished by applying a potential to the terminal electrodes of the stack. In the charge mode, the electrolyte from the reservoir moves in the direction opposite to the one of the discharge mode.

For FIG. 5a, such opposite movement means that the electrolyte moves counterclockwise. In the charge mode, the electrolyte enters the cell, such as cell 521 or 522, after passing through the return manifold 520, at the electrode, which acts as a negative electrode in the discharge mode but as a positive electrode in the charge mode. Such electrodes in FIG. 5a are the electrode 502 for the cell 521 and electrode 503 for the cell 522. At this electrode, the metal ions of the electrolyte may be reduced into elemental metal, which may be deposited back at the electrode. Zinc plates on top of each electrode 502, 503. For example, for the system in FIG. 5a, zinc ions may be reduced and deposited at the electrode 502 or 503 (Zn2++2 e−→Zn). The electrolyte then may pass upwards through a porous electrode, such as electrodes 505 and 504 in FIG. 5a, where halogen ions of the electrolyte may oxidize forming molecular halogen reactant.

For the case illustrated in FIG. 5a, chlorine ions of the metal-halide electrolyte oxidize at the electrodes 505 and 504 forming molecular chlorine. Because the system illustrated in FIG. 5a is placed under a pressure above the liquefication pressure for the halogen reactant, the halogen reactant, which is formed at the electrodes 505 and 504, is in liquid form after the aqueous solution is saturated with dissolved chlorine.

The electrolyte leaves the cell, such as cell 521 or 522, in a form of a mixture with the formed halogen reactant through flow paths 526, 527 and then through the pipe or manifold 115. A concentration of the metal halide electrolyte in the mixture can be lower than a concentration of the electrolyte that entered the cell from the pipe 120. From the pipe 115, the mixture may enter the reservoir, where it can be separated into the halogen reactant and the metal electrolyte per se using, for example, gravity and an optional sump plate, or some type of separating membrane.

Figure 5B:
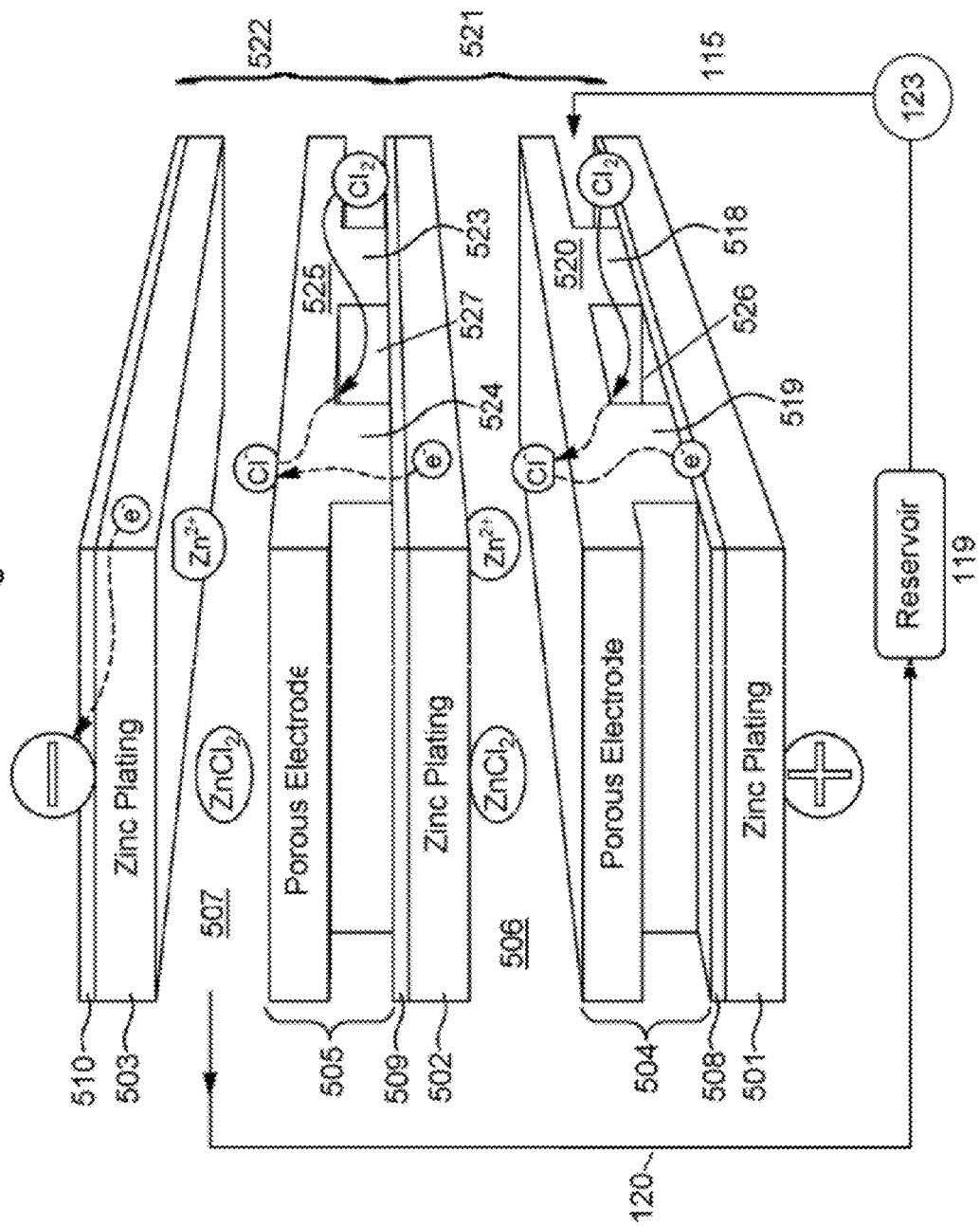
FIG. 5b schematically illustrates a three dimensional view of flow paths in the electrochemical system with upward flow in a discharge mode.

FIG. 5b illustrates an alternative flow configuration through the vertical stack 103 of electrochemical cells. In this embodiment, the electrochemical cells are inverted (i.e., placed upside down) relative to the embodiment illustrated in FIG. 5a. That is, the electrochemical cells are configured so that in discharge mode, the electrolyte flows from the bottom of each cell 521, 522, through flow paths 526, 527 then through the porous parts 520, 525 of electrodes 504, 505 into the reaction zones 506, 507 and then back into reservoir 119. In charge mode, the electrolyte flows in the opposite direction (i.e., from reaction zones 506, 507 down through electrodes 504, 505 into the flow paths 526, 527). In this embodiment, zinc plates on the bottom of the negative metal electrodes 501, 502, 503 in charge mode. In this manner, the electrodeposited zinc layer grows in a downward direction in charge mode.

In discharge mode, zinc oxidizes and thereby dissolves from the negative metal electrodes 502, 503. Zinc ions, $Zn^{2+}$ enter the electrolyte as the zinc dissolves. Molecular chlorine is reduced at the porous electrode to form chlorine ions.

As in the previous embodiment, a reservoir 119 is provided at the bottom the vessel 101. Also included is a discharge pump 123 operatively attached to the reservoir 119. Electrolyte is pumped from the reservoir 119 via a feed pipe or manifold 115 to flow paths 526, 527 between conductive spacers 518/519, 523/524 through the porous regions 502, 525 in electrodes 504, 505. The electrolyte exits the reactions zones 506, 507 and returns to the reservoir 119 via a return pipe or manifold 120.

Figure 3:
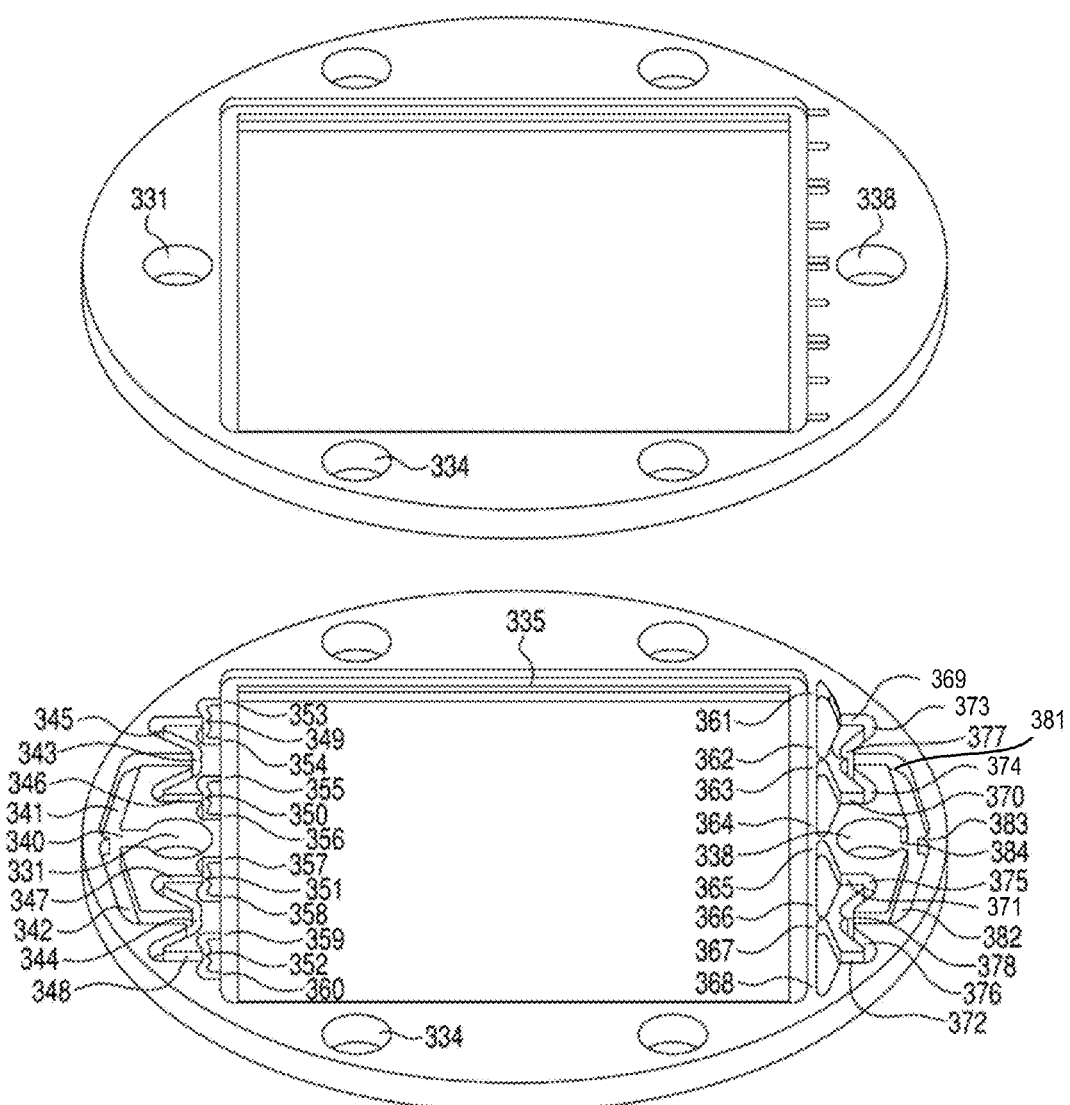
FIG. 3 illustrates a three dimensional view of cell frames that can be used in certain embodiments of the electrochemical system.

In some embodiments, the multiple flow paths may merge into a lesser number of flows before reaching the return manifold or pipe. For example, FIG. 3 shows that the electrolyte and the liquefied halogen reactant may leave the bottom of the cell through eight flow paths 361-368. Since the flow leaves through the bottom of the cell, paths 361-368 do not have a direct connection to the top of the cell in the view shown in FIG. 3. Adjacent flow paths 361 and 362, 363 and 364, 365 and 366, 367 and 368 merge at first-level merging nodes 369-372 into second-level flow paths 373, 374, 375 and 376 respectively. The second level flow paths further merge at two second level merging nodes 377 and 378 forming two third-level flow paths 381 and 382, which further merge at a third-level node 383, forming a single flow 384, which enters the return manifold 338. Each of the flow paths 361-368 have the same flow resistance as they have the same length and the same number of turns, which have the same radius, on its way to the return manifold.

As the result of the three levels of splitting, the flow of the metal halide electrolyte and the liquefied halogen reactant may enter the cell through eight separate paths 353, 354, 355, 356, 357, 358, 359, 360, each of which has the same flow resistance because they have the same length and the same number of turns, which have the same radius, i.e. the same geometry. The flow splitting nodes may split the flow of the electrolyte and the halogen reactant for each cell of the stack. The electrolyte and the liquefied halogen reactant may leave the cell through a multiple flow paths or through a single flow path.

In some embodiments, the multiple flow paths may merge into a lesser number of flows before reaching the return manifold or pipe. For example, FIG. 3 shows that the electrolyte and the liquefied halogen reactant may leave the bottom of the cell through eight flow paths 361-368. Since the flow leaves through the bottom of the cell, paths 361-368 do not have a direct connection to the top of the cell in the view shown in FIG. 3. Adjacent flow paths 361 and 362, 363 and 364, 365 and 366, 367 and 368 merge at first-level merging nodes 369-372 into second-level flow paths 373, 374, 375 and 376 respectively. The second level flow paths further merge at four second level merging nodes 377 and 378 forming two third-level flow paths 381 and 382, which further merge at a third-level node 383, forming a single flow 384, which enters the return manifold 338. Each of the flow paths 361-368 have the same flow resistance as they have the same length and the same number of turns, which have the same radius, on its way to the return manifold.

FIG. 3 illustrates an electrochemical cell that comprises a cell frame 301. Such an electrochemical cell may be used to achieve the structures and flows shown in FIG. 2. The cell frame 301 may include a feed manifold element 331, distribution channels, flow splitting nodes, spacer ledge 335, flow merging nodes, collection channels, return manifold element 338, and bypass conduit elements 334.

In some embodiments, plural cell frames 301, that are each identical or similar to the cell frame 301 depicted in FIG. 3, may be stacked vertically with the electrodes in place, to form the stack shown in FIG. 2. To form such a stack, the feed manifold element, such as the element 331 in FIG. 3, in each of the plural cells frames 301 may be aligned with the feed manifold element in another of the cell frames 301, thereby to form a feed manifold of the system. The distribution channels and the flow splitting nodes in each of the cell frames 301 may be aligned with the distribution channels and the flow splitting nodes in another of the cell frames 301, thereby forming a distribution zone of the system. The positive electrode (discharge mode) of each of the cells sits above or below the negative electrode (discharge mode) for each cell on the spaces ledges of the cell frames 301, thereby forming alternating layers of positive electrodes and negative electrodes.

The flow merging nodes and the collection channels in each of the plural cells frames 301 may be aligned with the flow merging nodes and the collection channels in another of the cell frames 301, thereby forming a collection zone of the system. The return manifold element, such as the element 338 in FIG. 3, in each of the cell frames 301 may be aligned with the return manifold element in another of the cell frames 301, thereby forming a return manifold of the system. The bypass conduit element, such as the element 334 in FIG. 3, in each of the cell frames 301 may be aligned with the bypass conduit element in another of the cell frames 301, thereby forming a bypass conduit of the system. The bypass conduit may be used for fluid flow and/or electrical wires or cables.

In some embodiments, the cell frame 301 may have a circular shape. Such a shape may facilitate insertion of the plural cells into a pressure containment vessel, which has a cylindrical shape, thereby reducing a production cost for the system. The frames 301 may comprise an electrically insulating material, which may be a polymer material, such as PVC.

The cell frame 301 based design may facilitate a low-loss flow with uniform distribution for the electrolyte and the halogen reactant; a bipolar electrical design; an ease of manufacture, internal bypass paths, and elements by which the operational stasis mode (described below) may be achieved.

Advantages of the cell frame 301 may include, but are not limited to, the flow-splitting design in the distribution zone that may include multiple order splits such as the first, second, and third order splits in the flow channels in FIG. 3, that result in multiple channels that each have the same flow resistance, because each of the channels has the same length and the number and radius of bends. FIG. 3 shows eight feed channels per cell that each have the same flow resistance. This design with multiple flow splits may allow maintenance of a laminar flow through each of the multiple channels. The design may allow equal division of flow volume between the multiple channels, independent of flow velocity, uniformity of viscosity, or uniformity of density in the electrolyte.

Modes of Operation

An Off Mode may be used for storage or transportation of the electrochemical system. During the Off Mode, the metal halide electrolyte and the halogen reactant are not delivered to the cell. A small amount of the halogen reactant, which may remain in the horizontally positioned, may be reduced and combined with metal ions to form metal halide. For example, the remaining liquefied chlorine reactant may be reduced into halogen anions and combined with zinc ions to form zinc chloride.

In the off mode, the terminal electrodes of the one or more cells of the system may be connected via a shorting resistor, yielding a potential of zero volts for the cells of the system. In some embodiments, a blocking diode preferably may be used to prevent reverse current flow through the system via any external voltage sources.

During the Discharge Mode the discharge pump may be on and the mixture of the metal halide electrolyte and the halogen reactant may be circulated through the cell(s) of the system. Electrons may be released as metal cations are formed from the oxidizable metal that constitutes the negative electrode. The released electrons may be captured by the halogen reactant, thereby reducing the reactant to halogen anions and creating an electrical potential on terminal electrodes of the cell(s) of the system. The demand for power from the system may consume the halogen reactant, causing a release of an additional dose of the liquefied halogen reactant from the reservoir into the feed pipe or manifold of the system.

During the Stasis or Standby Mode, there may be little or no flow of the metal halide electrolyte and the halogen reactant. The availability of the system may be maintained via a balancing voltage. This balancing voltage may prevent a self-discharge of the system by maintaining a precise electrical potential on the cell(s) of the system to counteract the electrochemical reaction forces that can arise when there is no circulation of the metal halide electrolyte and the halogen reactant. The particular design of the cell plates disclosed may interrupt shunt currents that would otherwise flow through the feed and return manifolds, while maintaining cell-to-cell electrical continuity.

Radial Flow

FIGS. 9a-9c and 10 illustrate an embodiment of disk shaped electrodes suitable for use in a radial flow cell 105, 521, 522 where the electrolyte flows in a radial direction. In this embodiment, the impermeable metal cathode 25 and the porous or permeable anode 23 have substantially disk shaped configurations. In other words, the electrodes may have an exact circular cross section, such as that of cathode 25 shown in FIGS. 9a and 9b, or slight deviation from a circular cross section, such as that of the scalloped anode 23 shown in these figures.

Figure 10:
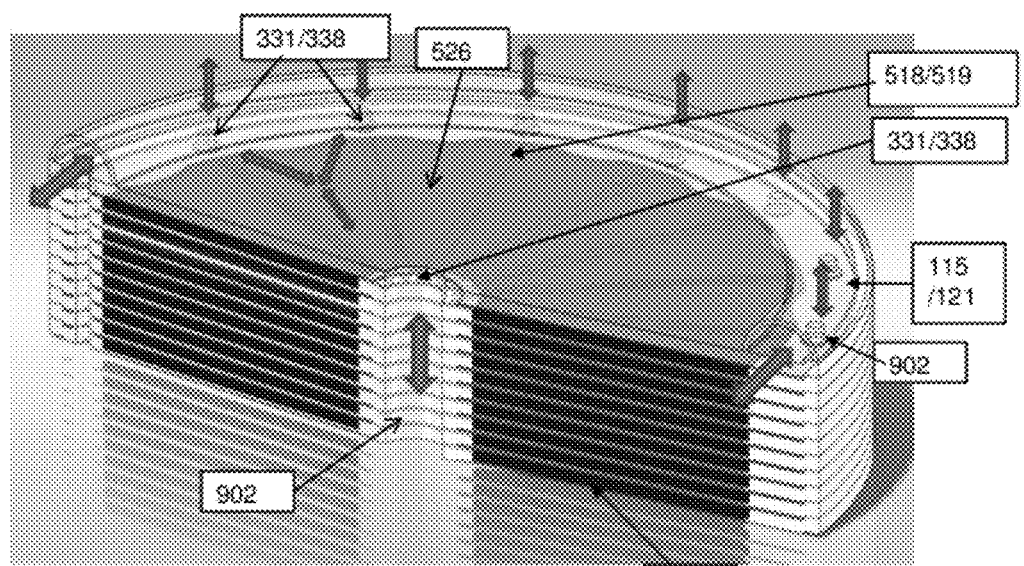
FIG. 10 illustrates a cross sectional view of a stack of radial flow cells suitable for use in a flow battery.

At least one central electrolyte flow conduit 901 extends through a central portion of the permeable electrode and through a central portion of the impermeable electrode. The flow conduit comprises a first opening in the central portion of the disk shaped permeable electrode 23 and a second opening in the central portion of the disk shaped impermeable electrode 25, such that the first opening is aligned with the second opening. As shown in FIG. 10, the central electrolyte flow conduit 901 comprises a first portion comprising a sealed tube located in the reaction zone 506 between the first opening in the permeable electrode 23 and the second opening in the impermeable electrode 25 and a second portion comprising an open area between the central opening in the impermeable electrode 25 of the first adjacent cell in the stack 103 and the second side of the permeable electrode 23. In other words, a central hole 901 is located in the center of both the impermeable metal cathode 25 and the porous anode 23.

At least one peripheral electrolyte flow inlet/outlet 902 is located in a peripheral portion of the electrochemical cell above or below the permeable electrode 23. In other words, a series of peripheral holes 902 are located around the periphery of the impermeable metal cathode 25.

As used herein, the "central portion" of the disk shaped permeable electrode comprises an imaginary central circular area on a major surface of the disk shaped permeable electrode that is concentric with the disk shaped permeable electrode and has a radius that is less than the radius of the disk shaped permeable electrode. The "central portion" of the disk shaped impermeable electrode comprises an imaginary central circular area on a major surface of the disk shaped impermeable electrode that concentric with the disk shaped impermeable electrode and has a radius that is less than the radius of the disk shaped impermeable electrode. The "peripheral portion" of the disk shaped permeable electrode comprises an imaginary annular area surrounding the imaginary central circular area on the major surface of the disk shaped permeable electrode.

The term "radial flow", as used herein, means a flow from an inlet in a central portion of an electrode to an outlet in a peripheral portion of the electrode, or from an inlet in a peripheral portion of an electrode to an outlet in a central portion of the electrode.

In one embodiment, the impermeable metal cathode 25 of one cell (e.g., 521) and the porous anode 23 (e.g., a permeable metal anode, such as a metal mesh or packed metal powder or a metal plate with holes) of the adjacent cell (e.g., 522) may be mechanically joined to each other using the conductive spacers 518, 519 to form a radial electrode assembly 900. The radial electrode assembly 900 can be made by brazing, welding or soldering at joints 903 along the conductive spacers 518, 519 and the periphery of the electrodes. The fabrication of flow cell electrode assemblies 900 is discussed in more detail in copending application Ser. No. 12/877,884, now U.S. Pat. No. 8,202,641, titled "Metal Electrode Assembly For Flow Battery", filed on the same date as the present application and hereby incorporated by reference in its entirety. Thus, the conductive spacers 518, 519 described above with respect to FIGS. 5a and 5b are located between the impermeable metal cathode 25 of one cell and the porous anode 23 of an adjacent cell to maintain a gap of the at least one electrolyte flow channel between the anode and the cathode. The spacers 518, 519, may be referred to as electrolyte flow dividers which are arranged in a radial pattern running from the central hole 901 to the periphery of the porous metal anode 23. The conductive spacers define radially oriented electrolyte flow paths or channels 526. In other words, the dividers divide the electrolyte flow channel or space between adjacent cells into a plurality of electrolyte flow channels or paths 526.

Figure 9D:
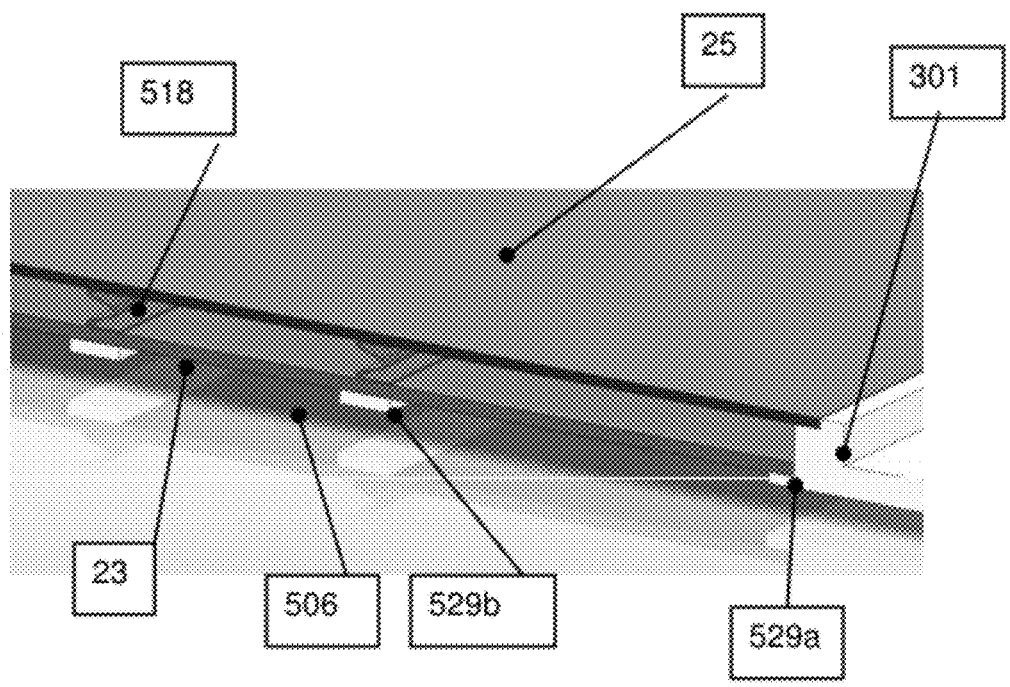

The electrodes are mounted in an electrically non-conducting (i.e., insulating) cell frame 301. As shown in FIG. 9d, the periphery of the annular electrically non-conducting cell frame 301 may comprise a lip 529a which protrudes into the circular space which houses the electrodes in the middle of the cell frame. The lip 529a provides separation between the impermeable metal cathode 25 and the porous anode 23 of the same flow cell 105, 521, 522 thereby creating the reaction zone 506 flow channel illustrated in FIG. 5a. In an alternative embodiment, the electrically non-conducting cell frame 301 does not include a lip 529a. Rather, the reaction zone 506 is produced by incorporating at least one electrically non-conducting spacer 529b between adjacent electrodes of the same cell. The spacers may be rail shaped spacers connected to the peripheral portion of the cell frame 301. Alternatively, the lip 529a and spacers 529b may be used in combination. Spring shaped, flexible conductive flow dividers 518 provide separation between adjacent cells. The dividers 518 may be rigid if desired.

In one aspect of this embodiment, the central hole 901 may be used as a feed manifold 331 and the peripheral holes 902 may be used as return manifolds 338. In an alternative aspect, the central hole 901 may be used as a return manifold 338 while one or more of the peripheral holes 902 may be used as feed manifolds 331. That is, the flow in the flow cells 105, 521, 522 may be reversed. In this manner, the flow cells may be operated in both charge and discharge modes.

In a non-limiting example, in charge mode, the stack 103 of cells is configured to provide a radial flow of the electrolyte from the at least one peripheral electrolyte flow inlet/outlet 902 into the reaction zone 506, then from the reaction zone through the disk shaped permeable (i.e., anode) electrode 23 into the at least one electrolyte flow channel 526 between the second side of the disk shaped permeable electrode and the adjacent impermeable (i.e., cathode) electrode 25 of the adjacent cell, then out into the at least one central electrolyte flow conduit 901. In discharge mode, the stack 103 is configured to provide a radial flow of the electrolyte from the at least one central electrolyte flow conduit 901 into the at least one electrolyte flow channel 526 between the second side of the disk shaped permeable electrode 23 and the adjacent impermeable electrode 25 of the adjacent cell, through the disk shaped permeable electrode 23 into the reaction zone 506, and then from the reaction zone out through the at least one peripheral electrolyte flow inlet/outlet 902. Of course, the flow direction may be reversed if desired.

Figure 15A:
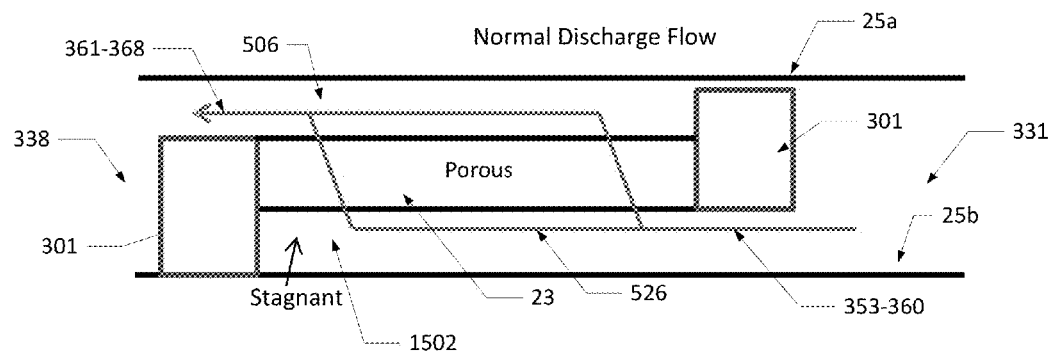
FIGS. 15a and 15b illustrate a side cross section view of embodiments of a flow cell with and without an electrolyte bypass opening, respectively.

As shown in FIG. 15a, in the non-limiting example of the vertical stack 103 of horizontal cells 105, 521, 522, the disk shaped permeable electrode 23 of each cell 521 is located below the disk shaped impermeable electrode 25a of the same cell 521. In the charge mode, the electrolyte flows down from the reaction zone 506 flow channel between electrodes 23 and 25a, through the disk shaped permeable electrode 23 into the at least one electrolyte flow channel 526 between electrode 23 and an impermeable electrode 25b of the adjacent cell. In the discharge mode, the electrolyte flows from the at least one electrolyte flow channel 526 up through the disk shaped permeable electrode 23 into the reaction zone 506.

FIG. 10 illustrates a stack 103 of radial flow cells. As can be seen in FIG. 10, the stacked central holes 901 of the electrically non-conducting cell frames 301 form a central manifold while the stacked peripheral holes 902 of the electrically non-conducting cell frames 301 form multiple peripheral manifolds (i.e., holes 902 form a plurality of channels in the frames 301).

If desired, the peripheral holes 902 may extend through one or both electrodes. For example, the plurality of peripheral electrolyte holes (i.e., inlet/outlets) 902 comprise an opening through the peripheral portion of the disk shaped impermeable electrode 25 (but not through electrode 23) and a plurality of channels in the frame 301. Other configurations may also be used.

The central manifold may be configured as a feed manifold 331 by pumping electrolyte with a pump 123 (shown in FIG. 5a) from the reservoir 119 to the central manifold. In this configuration, electrolyte spreads across the porous electrode 23 laterally as it flows out of the central manifold radially toward the return manifolds 338. If the peripheral holes 902 are used as feed manifolds 331 and the central hole 901 is used as a return manifold 338, then the electrolyte will tend to focus rather than spread as it approaches the central hole 901. As illustrated in FIG. 10, a toroidal shaped peripheral manifold 115/121 is formed over the periphery of the stack 103 and in communication with the peripheral holes 902 to provide or collect electrolyte flowing in the holes 902. Other configurations may be used.

Figure 11:
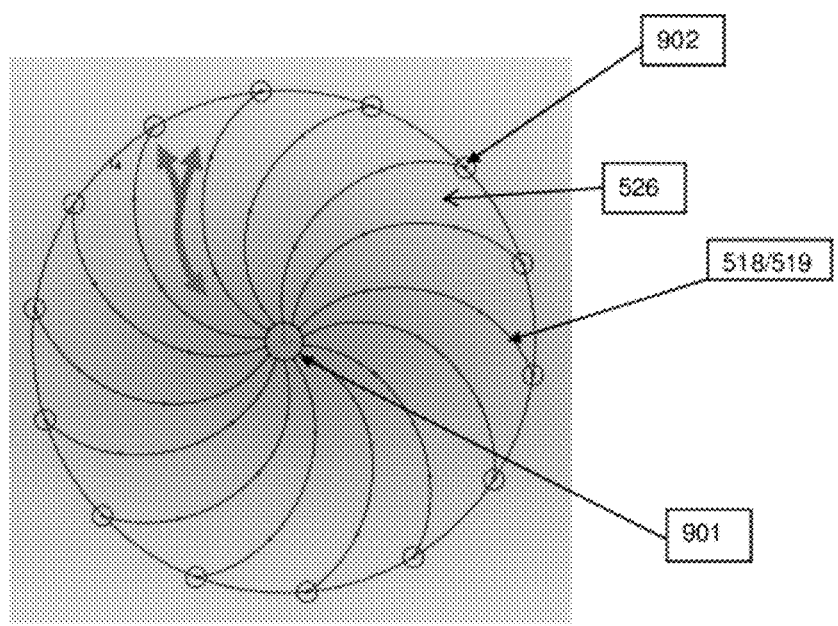
FIG. 11 is a schematic illustration of an embodiment of a radial flow cell having curved spacers/flow directors.

FIG. 11 illustrates another configuration for a radial flow cell 105, 521, 522. In this embodiment, the flow cell has curved spacers/flow directors or dividers 518, 519 which form a curved flow channel or path 526. As in the previous embodiment, this embodiment has a single central hole 901 which can be part of a central manifold. Also as in the previous embodiment, peripheral holes 902 can be located at the end of the curved spacers/flow directors 518, 519. Alternatively, the peripheral holes 902 can be located between adjacent curved spacers/flow directors 518, 519 at ends of flow channels or paths 526. It should be noted that the electrolyte enters the cell on one side of a porous electrode 23 through hole 901 or 902 and exits on the opposite side the porous electrode. Thus, the holes 901 and 902 communicate with opposite sides of a given electrode. As electrolyte flows out of either the central hole 901 or the peripheral holes 902, a rotational component of motion is added to the lateral and radial motion of the electrolyte to generate a spiral radial flow of the electrolyte.

Figure 12:
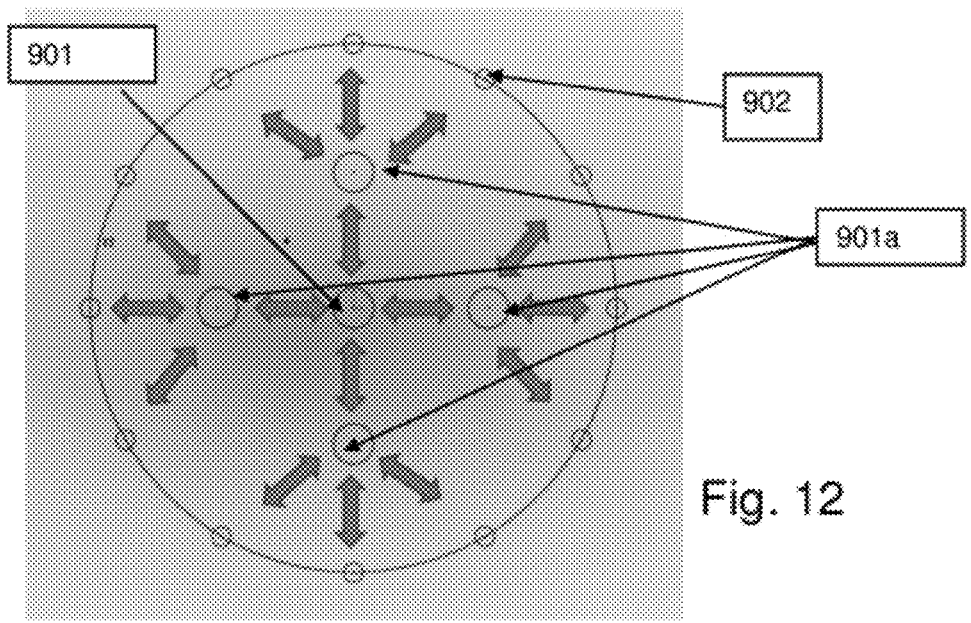
FIG. 12 is a schematic illustration of an embodiment of a radial flow cell with multiple flow inlets and multiple flow outlets.

FIG. 12 illustrates another configuration for a radial flow cell 105, 521, 522. In this embodiment, the flow cell includes multiple "central" holes 901 in the central portions of the electrodes 23, 25. Preferably, but not necessarily, at least one of the central holes 901 is located in the true center of the impermeable metal cathode 25 and the porous anode 23. As illustrated, the flow cell includes additional four central holes 901a in addition to the central hole 901 at the true center. The number of additional central holes 901a is not limited to four, however. Alternative embodiments may have more or less additional central holes 901a.

As illustrated, the present embodiment does not include spacers/flow directors 518, 519. In alternative embodiments, however, this embodiment may include spacers/flow directors 518, 519. The spacers/flow directors 518, 519 may be either straight or curved as in the previous embodiment. Further, as in the previous embodiments, the central holes 901, 901a and the peripheral holes 902 can be configured to be either feed manifolds 331 or return manifolds 338.

Figure 13:
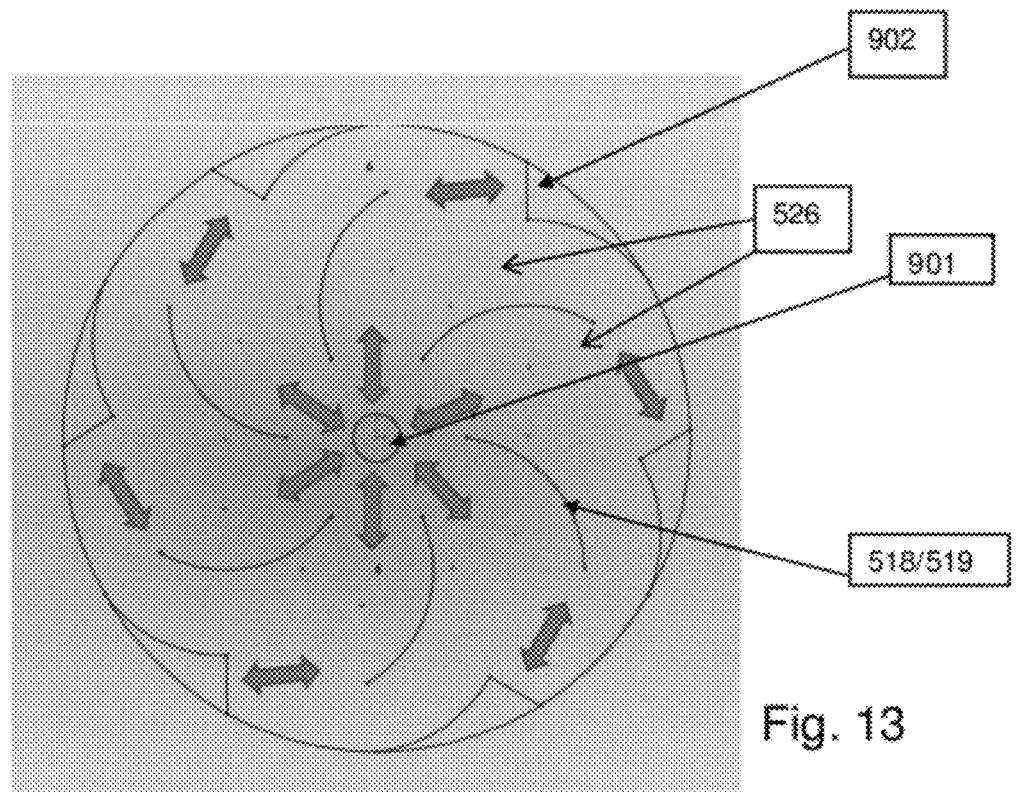
FIG. 13 is a schematic illustration of an embodiment of a radial flow cell with discontinuous spacers/flow directors that allow electrolyte mixing.

FIG. 13 illustrates an embodiment of a radial flow cell 105, 521, 522 with discontinuous spacers/flow directors or dividers 518, 519 that allow electrolyte mixing. That is, the spacers/flow directors 518, 519 of this embodiment do not extend all the way from the central hole 901 to the periphery of the electrodes. Because the spacers/flow directors 518, 519 are discontinuous, electrolyte in adjacent flow channels or paths 526 can mix via gaps in the spacers/flow directors 518, 519.

The discontinuous spacers/flow directors 518, 519 illustrated in FIG. 13 are curved. As discussed above, the curve shape adds a rotational component to the electrolyte motion. In an alternative embodiment, the discontinuous spacers/flow directors 518, 519 are straight. Further, as illustrated, the peripheral holes 902 are substantially wedge shaped. In other words, holes 902 comprise directional peripheral electrolyte inlet/outlets which protrude at a non-zero angle from a plurality of channels in the frame 301. The substantially wedge shape of the peripheral holes 902 may provide a more effective electrolyte delivery or removal for the electrode configuration of this embodiment. The shape of the peripheral holes 902, however, is arbitrary.

Figure 14:
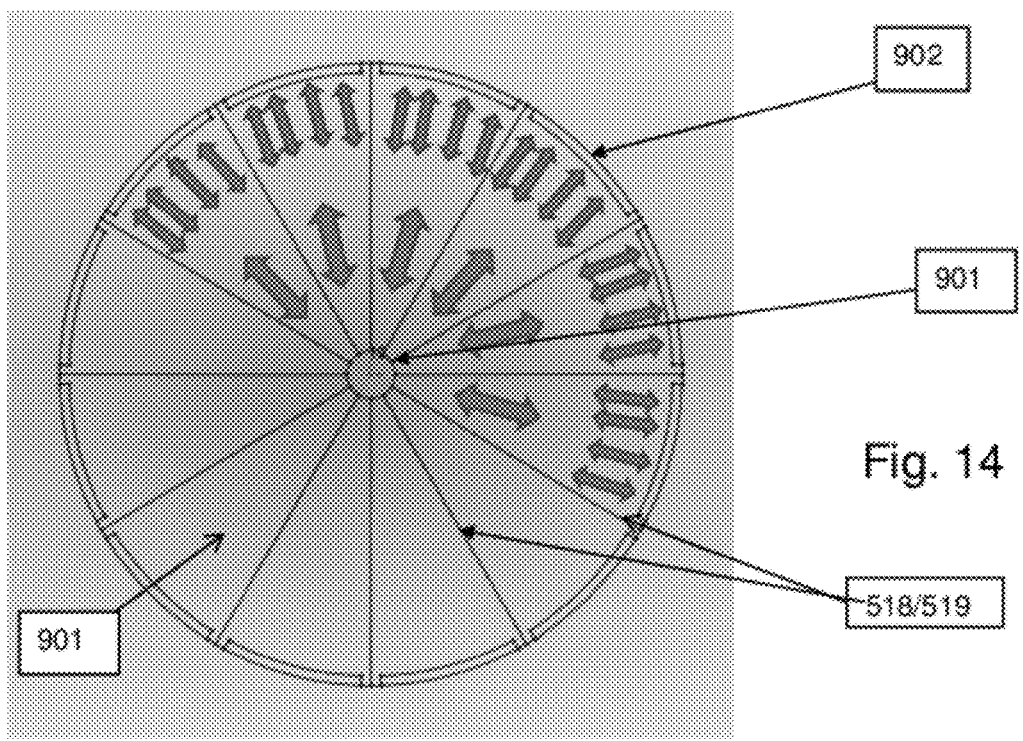
FIG. 14 is a schematic illustration of an embodiment of a radial flow cell with a single central inlet/outlet and multiple slot-like peripheral inlet/outlets.

FIG. 14 is a schematic illustration of an embodiment of a radial flow cell with a single central inlet/outlet 901 and multiple slot shaped peripheral inlet/outlets 902. The slot shaped peripheral inlet/outlets 902 may extend substantially from one spacer/flow director 518, 519 to adjacent spacer/flow director 518, 519 defining the wide end of the wedge shaped flow path 526. As illustrated in FIG. 14, a single slot shaped peripheral inlet/outlet 902 is provided for each flow path 526. Alternatively, however, multiple slot shaped peripheral inlet/outlets 902 may be provided within one or more of the flow paths 526.

Fluid Bypass Opening

Figure 15B:
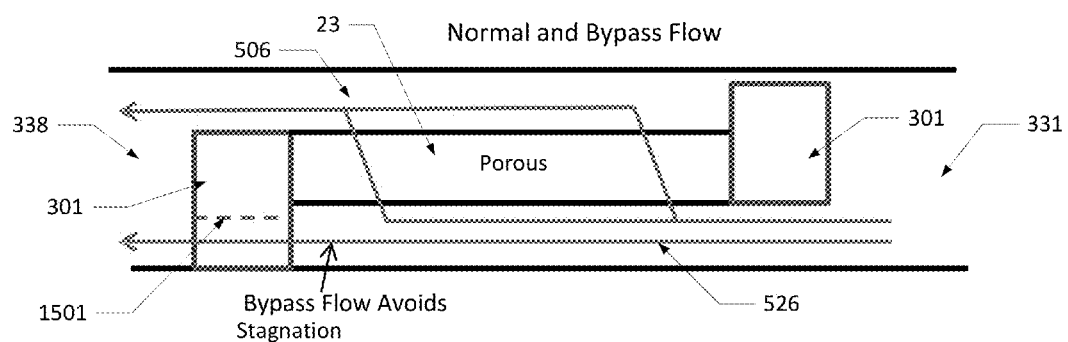

FIG. 15b illustrates a side cross section view of an embodiment of a flow cell with a fluid bypass opening 1501. The cell may have polygonal or disk shaped electrodes of the prior embodiments. The inventors have discovered that flow cell designs without a bypass opening schematically shown in FIG. 15a may result in a stagnant flow zone 1502 at the end of the flow path 526 adjacent to the cell frame 301. Electrolyte flows out of the feed manifold 331 through in paths 353-360 and into the flow path or channel 526 between electrodes 23 and 25b of adjacent cells. In FIG. 15a, all of the electrolyte must flow from channel 526 through the porous electrode 23 into the reaction zone 506 flow channel between electrodes 23 and 25a of the cell, and then exit the flow cell via outlet paths 361-368 to the return manifold 338. The hydrodynamics of the flow cell, however, result in the formation of a stagnant zone 1502 adjacent to the cell frame 301 at the exit end of the flow path 526, where the electrolyte does not flow through electrode 23.

The inventors have discovered that the hydrodynamics of the flow cell may be improved with the addition of a fluid bypass opening 1501 in the cell frame 301. The fluid bypass opening 1501 is an opening through the cell frame from flow channel 526 or reaction zone flow channel 506 into the return manifold 338. The opening 1501 is configured to allow a portion of the electrolyte, such as 0-100%, for example 10-20% by volume, to flow directly from the flow path or channel 526 to the return manifold 338 without passing through the porous electrode 23. In this way, the stagnant zone 1502 can be eliminated, yet the majority of the electrolyte (e.g., at least 80%) flows through the porous electrode 23. The overall result is a flow cell with improved performance. If desired, the flow channel 526 may be is tapered (i.e., gradually narrowed) adjacent to at least one bypass opening to further reduce or eliminate the stagnant zone.

Separation Device

Figure 7:
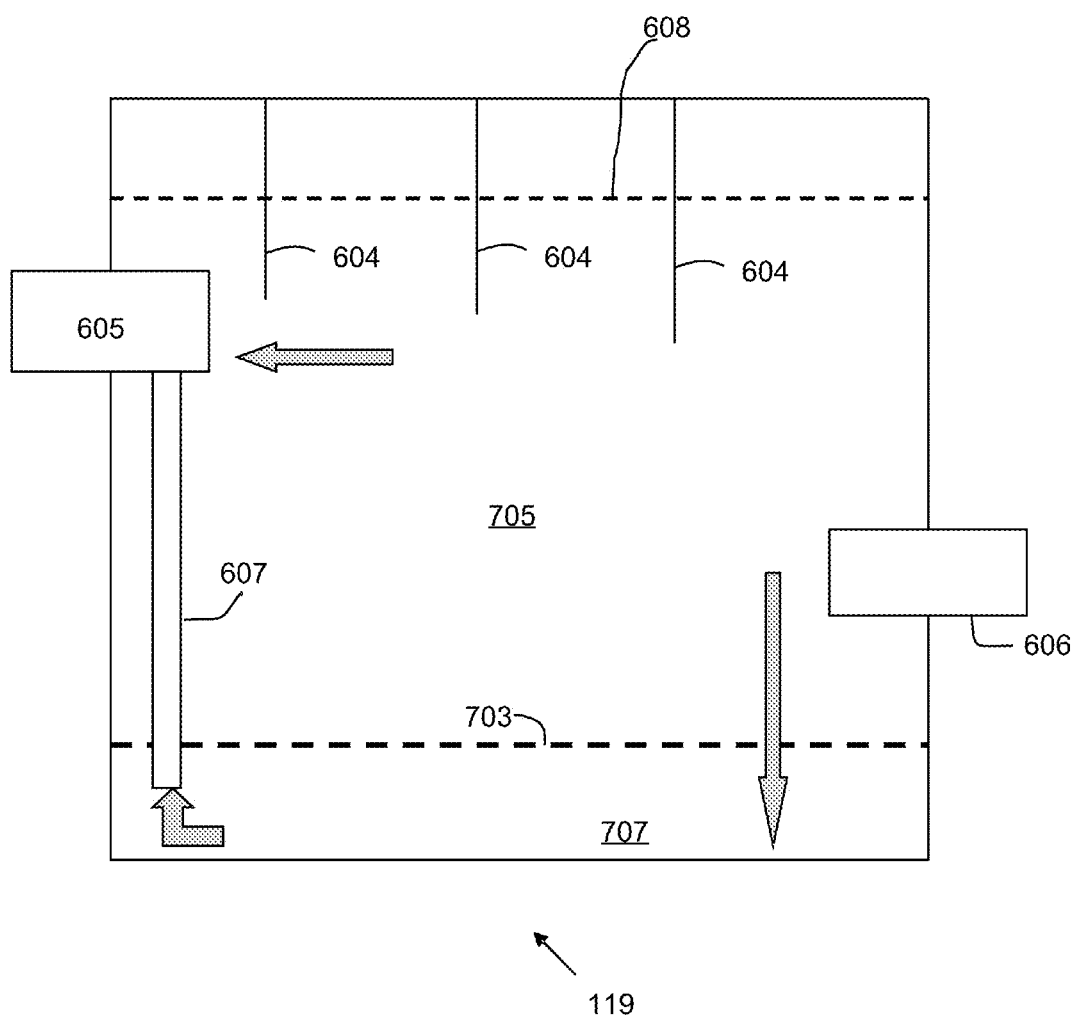
FIG. 7 schematically illustrates a side cross-sectional view of a reservoir which has a separation device in a discharge operation of the electrochemical system.

FIG. 7 illustrates another embodiment of the reservoir 119 which has a separation device 703. The reservoir 119 of the embodiment of FIG. 7 may be used with the system and method of any of the embodiments described above. The baffle plates 604 of the embodiment of FIG. 6 are optional and are not shown in the bottom portion of the reservoir 119 for clarity. The separation device 703 can be, for example, a molecular sieve, a selective membrane, or other device that is capable of separating one component of the electrolyte mixture from other components of the electrolyte, thereby facilitating modes of operation (e.g., charge and discharge) of the flow battery. The separation device 703, having an appropriate geometry and properties for separating the desired components, is preferably disposed in the reservoir 119 between the inlet to the feed line 607 and the pump inlets/outlets 605 and 606 to separate the electrolyte mixture in reservoir 119 into two volumes 705, 707 during the flow battery operation. A halogen content or concentration gradient that is provided by the separation device is desirable for both the chloride ions and the liquid chlorine type of halogen reactant.

The first volume 705 is provided for selective electrolyte component accumulation and the second volume 707 is provided for selective liquefied halogen (such as aqueous chlorine) accumulation. The second volume 707 can be located below the first volume, thereby taking advantage of the liquefied halogen having a higher density than the remaining electrolyte components. Thus, the halogen permeation from volume 705 into volume 707 may be assisted by gravity. However, depending on the type and operation of separation device 703 and the particular electrolyte and halogen components, volume 707 may be located above or to the side of volume 705. An appropriate molecular sieve or membrane 703 can selectively allow desired molecules to pass there through. The selectivity can be based on, for example, a molecular size, and/or an electrical charge of a component.

The permeability of the molecular sieve or membrane can be variable as a function of parameters such as pressure, temperature, chemical concentration, etc. One example of a molecular sieve comprises a mesoporous carbon membrane that provides size-based selectivity of molecules that can diffuse therethrough. Larger molecules are more difficult to penetrate the pores. This provides a higher permeability to the liquefied halogen reactant (e.g., aqueous chlorine) than the metal-halide electrolyte component (e.g., zinc chloride). In addition, the separation device can further comprise a device configured to apply an electric field over the membrane or the molecular sieve. An externally applied electric field can facilitate molecular diffusion through the membrane and aid the electrical-charge-based selective diffusion.

Depending on the specific liquefied halogen and the metal halide electrolyte used, the molecular sieves can be selected to have pore sizes suitable for passing predetermined molecules. Some examples of molecular sieves are described, for example, in U.S. Pat. No. 3,939,118. The molecular sieves can include granular natural or synthetic silica-alumina materials which can have lattice structures of the zeolite type (see, e.g., the monograph Molekularsiebe (Molecular Sieves) by O. Grubner, P. Jiro and M. Ralek, VEB-Verlag der Wissenschaften, Berlin 1968), with pore widths of 2 Å to 10 Å (e.g., zeolite powder or bead sieves, such as Grace Davison SYLO-SIV® brand powders), silica gel with pore widths of 40 Å to 100 Å,, which are optionally absorbed in glass beads, and modified borosilicate glasses according to W. Haller (J. Chem. Phys. 42, 686 (1965)) with pore widths between 75 Å and 2,400 Å. . Molecular sieves based on organic products may also be used. These products include 3-dimensionally crosslinked polysaccharides such as dextran gels (Sephadex grades, a product marketed by GE Healthcare Life Sciences), which can optionally be alkylated (Sephadex-LH grades, a product marketed by GE Healthcare Life Sciences), agarose gels (Sepharose, a product marketed by GE Healthcare Life Sciences), cellulose gels and agar gels. Other examples of synthetic organic gels include crosslinked polyacrylamides and polyethylene oxides crosslinked via acrylate groups (trade name Merckogel OR). Ion exchange gels such as three-dimensionally crosslinked polystyrenes provided with sulphonic acid groups and the dextran gels already mentioned above, where they possess the acid groups or ammonium groups required for ion exchange (dextran gel ion exchangers), may also be used.

The separation device can include a porous container or a tray that holds the membrane or the molecular sieve materials. The molecular sieve materials could be in granular or powder form. The container can include electrodes or conductive plates for applying an electric field to the membrane or the molecular sieve materials. A voltage can be applied to the electrodes or conductive plates from a voltage output of the flow battery, or from a different power source (e.g., grid power, small battery located inside or outside the flow battery vessel 101, etc.). The voltage applied to the separation device facilitates the selective diffusion of the liquefied halogen reactant through the separation device. The separation device can be permanently coupled (e.g., welded, glued, etc.) or removably coupled (e.g., bolted, clamped, etc.) to a wall of the reservoir 119. Alternatively, only the granular molecular sieve materials or the membrane may be removable from the porous container or tray, while the container or tray may be permanently coupled to the wall of the reservoir.

It should be noted that the first volume 705 does not have to exclusively contain only the remaining electrolyte components and that the second volume 707 does not have to exclusively contain only the liquefied halogen (such as aqueous chlorine). A substantial concentration difference of halogen reactant or remaining electrolyte components across the separation device 703 is sufficient. Thus, the first volume 705 may contain the liquefied halogen in addition to the remaining electrolyte components and the second volume 707 may contain the remaining electrolyte components in addition to the liquefied halogen, as long as there is a higher liquefied halogen concentration in volume 707 than in volume 705, and/or as long as there is a higher remaining electrolyte components concentration in volume 705 than in volume 707. The concentration difference can be, for example, an at least 10% difference in concentration of the halogen reactant between the first and second volumes, such as an at least 50% difference, such as an at least 100% difference, such as an at least 200% difference, for example a 10-500% difference. The separation device 703 can be selected (e.g., a specific pore size may be selected) and/or operated (e.g., by applying a particular voltage) to provide the desired concentration difference.

In the discharge mode of flow battery operation illustrated in FIG. 7, the feed line 607 has an inlet in the second volume 707 of the reservoir 119 below the separation device 703, and feeds fluid with a higher concentration of halogen reactant (i.e., the fluid with a higher concentration of desired elements for discharge flow function) from volume 707 into the flow loop. The inlet 605 of the discharge pump intakes the fluid from the first volume 705, which has a higher concentration of the remaining electrolyte components than volume 707. Optionally, the inlet 605 of the discharge pump may be omitted or may remain inoperative during discharge mode if sufficient electrolyte is present in the second volume 707. The electrolyte and the liquid halogen are mixed in the flow loop and after flowing through the cells and undergoing reactions therein, the fluid mixture is discharged back into the reservoir 119. Preferably, the mixture is discharged into the first volume 705 from charge pump inlet/outlet 606. However, a different, separate outlet may be used to discharge the mixture into volume 705 from the flow loop. Unused halogen reactant selectively or preferentially permeates through the separation device 703 (i.e., halogen reactant permeates through device 703 at a higher rate than the remaining electrolyte components) and selectively or preferentially accumulates in the second volume 707. Other electrolyte components have a lower permeability through the separation device 703 than the halogen and preferentially remain in the first volume 705. A concentration difference described above is thus established and maintained with the help of the separation device 703.

Figure 8:
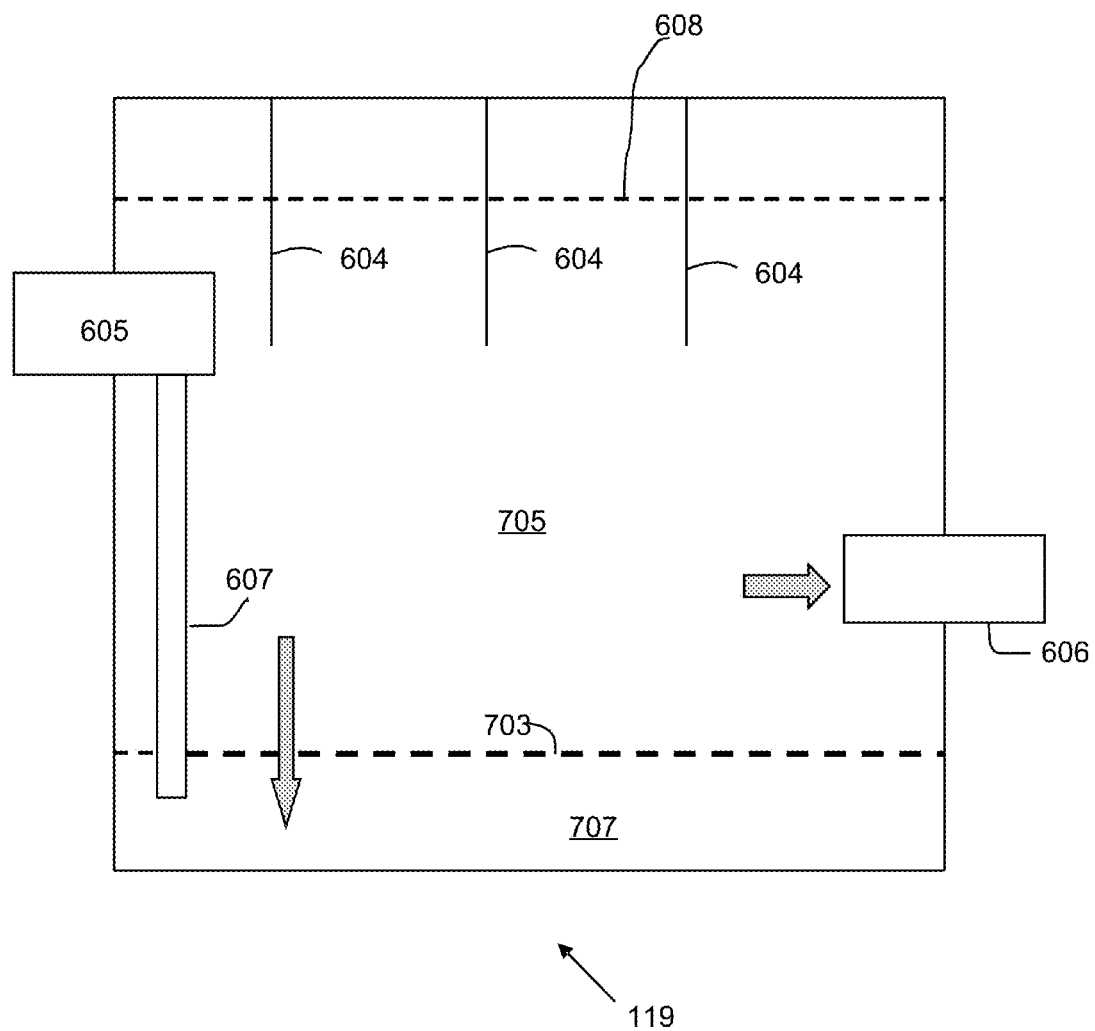
FIG. 8 schematically illustrates a side cross-sectional view of a reservoir which has a separation device in a charge operation of the electrochemical system.

In the charge mode illustrated in FIG. 8, the remaining electrolyte components in the first volume 705 are fed into the flow loop by the charge pump inlet 606 located in the first volume 705 above the separation device 703. The concentrated halogen in the second volume 707 is preferably excluded or minimized from being taken into the flow loop. After flowing through the cells and undergoing reactions therein, the fluid is discharged back into the reservoir 119. Preferably, the fluid is discharged from the discharge pump inlet/outlet 605 into the first volume 705. However, a different, separate outlet may be used to discharge the fluid into volume 705 from the flow loop. The discharged fluid is separated by the separation device 703, the halogen reactant selectively permeates into the second volume 707, leaving a higher concentration of the electrolyte component(s) in the first volume 705 than in the second volume 707.

Advantageously, the separation device enables an architecture with simplified single flow loop plumbing, valving, pump layout, etc. Alternative flow battery designs typically require two independent flow systems which are more complicated, more costly, and are more prone to cross leakage, etc.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:
1. An electrochemical flow cell, comprising:
a permeable electrode;
an impermeable electrode located adjacent to and spaced apart from the permeable electrode;
a reaction zone electrolyte flow channel located between a first side of the permeable electrode and a first side of the impermeable electrode;

at least one electrolyte flow channel located adjacent to a second side of the permeable electrode;

at least one central electrolyte flow conduit extending through a central portion of the permeable electrode and through a central portion of the impermeable electrode; and at least one peripheral electrolyte flow inlet/outlet located in a peripheral portion of the electrochemical cell above or below the permeable electrode.

2. The electrochemical flow cell of claim 1, wherein:
the permeable electrode is disk shaped;
the impermeable electrode is disk shaped;
the at least one central electrolyte flow conduit comprises a first opening in the central portion of the disk shaped permeable electrode and a second opening in the central portion of the disk shaped impermeable electrode;
the first opening is aligned with the second opening;
the central portion of the disk shaped permeable electrode comprises an imaginary central circular area on a major surface of the disk shaped permeable electrode that is concentric with the disk shaped permeable electrode and has a radius that is less than the radius of the disk shaped permeable electrode;
the central portion of the disk shaped impermeable electrode comprises an imaginary central circular area on a major surface of the disk shaped impermeable electrode that concentric with the disk shaped impermeable electrode and has a radius that is less than the radius of the disk shaped impermeable electrode; and
the peripheral portion of the disk shaped permeable electrode comprises an imaginary annular area surrounding the imaginary central circular area on the major surface of the disk shaped permeable electrode.

3. The electrochemical flow cell of claim 2, wherein:
the at least one peripheral electrolyte flow inlet/outlet comprises an electrolyte flow inlet in charge mode and an electrolyte flow outlet in discharge mode; and
the second opening comprises an electrolyte flow outlet in the charge mode and an electrolyte flow inlet in the discharge mode.

4. The electrochemical flow cell of claim 3, wherein:
the electrochemical flow cell is located in a stack of electrochemical flow cells;
a disk shaped impermeable electrode of a first adjacent cell in the stack is located adjacent to the second side of the disk shaped permeable electrode; and
a disk shaped permeable electrode of a second adjacent cell in the stack is located adjacent to a second side of the disk shaped impermeable electrode.

5. The electrochemical flow cell of claim 4, wherein: in charge mode, the stack is configured to provide a radial flow of the electrolyte from the at least one peripheral electrolyte flow inlet/outlet into the reaction zone, then from the reaction zone through the disk shaped permeable electrode into the at least one electrolyte flow channel between the second side of the disk shaped permeable electrode and the adjacent impermeable electrode of the first adjacent cell, then out into the at least one central electrolyte flow conduit; and
in discharge mode, the stack is configured to provide a radial flow of the electrolyte from the at least one central electrolyte flow conduit into the at least one electrolyte flow channel between the second side of the disk shaped permeable electrode and the adjacent impermeable electrode, through the disk shaped permeable electrode into the reaction zone, and then from the reaction zone out through the at least one peripheral electrolyte flow inlet/outlet.

6. The electrochemical flow cell of claim 5, wherein:
the stack comprises a vertical stack of horizontal cells;
the disk shaped permeable electrode of each cell is located below the disk shaped impermeable electrode of the same cell;
in the charge mode, the electrolyte flows down from the reaction zone through the disk shaped permeable electrode into the at least one electrolyte flow channel; and
in the discharge mode, the electrolyte flows from the at least one electrolyte flow channel up through the disk shaped permeable electrode into the reaction zone.

7. The electrochemical flow cell of claim 4, wherein the at least one central electrolyte flow conduit comprises a first portion comprising a sealed tube located in the reaction zone between the first opening in the permeable electrode and the second opening in the impermeable electrode and a second portion comprising an open area between the central opening in the impermeable electrode of the first adjacent cell in the stack and the second side of the permeable electrode.

8. The electrochemical flow cell of claim 4, wherein the at least one central electrolyte flow conduit comprises a single conduit and the at least one peripheral electrolyte flow inlet/outlet comprises a plurality of peripheral electrolyte inlet/outlets.

9. The electrochemical flow cell of claim 8, wherein the plurality of peripheral electrolyte inlet/outlets comprise a plurality of channels in a frame which supports the stack.

10. The electrochemical flow cell of claim 4, wherein the at least one central electrolyte flow conduit comprises a plurality of conduits and the at least one peripheral electrolyte flow inlet/outlet comprises a plurality of peripheral electrolyte inlet/outlets.

11. The electrochemical flow cell of claim 10, wherein the plurality of peripheral electrolyte inlet/outlets comprise at least one third opening through the peripheral portion of the disk shaped impermeable electrode and a plurality of channels in a frame which supports the stack.

12. The electrochemical flow cell of claim 4, further comprising:
a plurality of electrically conductive dividers located in contact with the second side of the disk shaped permeable electrode, the plurality of dividers dividing the at least one electrolyte flow channel into a plurality of electrolyte flow channels; and
at least one insulating spacer which maintains a gap of the reaction zone by spacing the first side of the permeable electrode from the first side of the impermeable electrode.

13. The electrochemical flow cell of claim 12, wherein:
the plurality of electrically conductive dividers maintain a gap of the at least one electrolyte flow channel by spacing the second side of the disk shaped permeable electrode from the second side of the disk shaped impermeable electrode of the first adjacent cell in the stack;
the plurality of electrically conductive dividers electrically connect the disk shaped permeable electrode with the disk shaped impermeable electrode of the first adjacent cell such that the plurality of electrolyte flow channels are located between the disk shaped permeable electrode and the disk shaped impermeable electrode of the first adjacent cell; and
the reaction zone electrolyte flow channel comprises a channel in which a metal from the electrolyte is deposited in a charge mode on the impermeable electrode.

14. The electrochemical flow cell of claim 12, wherein the plurality of dividers are curved and the stack is configured to provide a spiral radial flow of the electrolyte.

15. The electrochemical flow cell of claim 12, wherein the at least one peripheral electrolyte flow inlet/outlet comprises a plurality of directional peripheral electrolyte inlet/outlets which protrude at a non-zero angle from a plurality of channels in a frame which supports the stack.

16. The electrochemical cell of claim 15, wherein the plurality of dividers comprise a plurality of curved discontinuous dividers which extend adjacent to only a part of second side of the disk shaped permeable electrode, the plurality of curved discontinuous dividers dividing the at least one flow channel into a plurality of discontinuous flow channels that allow electrolyte from adjacent discontinuous flow channels to mix.

17. The electrochemical flow cell of claim 12, wherein the plurality of electrically conductive dividers divide the at least one electrolyte flow channel into a plurality of wedge shaped electrolyte flow channels, each wedge shaped channel extending from the central electrolyte flow conduit to one of a plurality of slot shaped peripheral electrolyte inlet/outlets.

18. The electrochemical flow cell of claim 5, further comprising an electrolyte bypass opening configured to allow a portion of the electrolyte to flow between the at least one peripheral electrolyte flow inlet/outlet and the bypass opening without having to flow through the disk shaped permeable electrode.

19. A flow battery, comprising:
a pressure vessel;
the stack of electrochemical flow cells of claim 4 located in the pressure vessel;
a reservoir located in the pressure vessel, the reservoir configured to accumulate a metal halide electrolyte component and a liquefied halogen reactant; and
a flow circuit located in the pressure vessel, the flow circuit configured to deliver the halogen reactant and the metal halide electrolyte between the reservoir and the stack of electrochemical cells.

20. The flow battery of claim 19, wherein:
the at least one peripheral electrolyte flow inlet/outlet is fluidly connected to at least one peripheral electrolyte manifold located in a frame supporting the stack;
in at least one of charge mode and discharge mode, the peripheral electrolyte manifold acts as the metal halide electrolyte component and the liquefied halogen reactant inlet manifold and the at least one central electrolyte flow conduit acts as an outlet manifold;
in the at least one other one of the charge mode and the discharge mode, the peripheral electrolyte manifold acts as the metal halide electrolyte component and the liquefied halogen reactant outlet manifold and the at least one central electrolyte flow conduit acts as an inlet manifold; and
a pressure in an inner volume of the pressure vessel is above a liquefication pressure for the halogen reactant.

21. A method of operating a flow battery comprising of a stack of electrochemical flow cells, the method comprising:
providing a radial flow of a metal halide electrolyte component and a liquefied halogen reactant between at least one peripheral inlet located in a peripheral portion of a reaction zone electrolyte flow channel of at least one cell in the stack and at least one central outlet located in a central portion between adjacent cells in the stack.

22. The method of claim 21, wherein:
each cell in the stack comprises a disk shaped impermeable electrode and a disk shaped permeable electrode separated by the reaction zone electrolyte flow channel;
the reaction zone flow channel is located between a first side of the disk shaped permeable electrode and a first side of the disk shaped impermeable electrode;
at least one flow channel is located between the second side of the permeable electrode and a second side of an impermeable electrode of an adjacent cell in the stack;
the at least one central outlet comprises at least one opening in the central portion of the impermeable electrode of the adjacent cell in the stack; and
the at least one central outlet connects to a sealed tube which extends through the central portion of the reaction zone of the adjacent cell.

23. The method of claim 22, wherein the radial flow of the metal halide electrolyte component and the liquefied halogen reactant is provided in charge mode from the at least one peripheral inlet into the reaction zone where metal from the metal halide electrolyte is deposited on the impermeable electrode, then from the reaction zone through the permeable electrode into the at least one flow channel, and then from the at least one flow channel into at least one central outlet.

24. The method of claim 23, wherein the at least one peripheral inlet in the charge mode functions as an outlet in discharge mode, and at the at least one central outlet functions as a central inlet in the discharge mode.

25. The method of claim 24, further comprising providing a radial flow of the metal halide electrolyte component and the liquefied halogen reactant in the discharge mode from the least one central inlet into the at least one flow channel, then from the at least one flow channel through the permeable electrode into the reaction zone where metal on the impermeable electrode is consumed, and then from the reaction zone to the at least one peripheral outlet.

26. The method of claim 25, wherein:
the stack comprises a vertical stack of horizontal cells;
the disk shaped permeable electrode of each cell is located below the disk shaped impermeable electrode of the same cell;
in charge mode, the electrolyte flows down through the disk shaped permeable electrode into the at least one flow channel; and
in discharge mode, the electrolyte flows from the at least one flow channel up through the disk shaped permeable electrode into the reaction zone.

27. The method of claim 25, wherein:
the at least one flow channel comprises a plurality of flow channels separated by a plurality of electrically conductive dividers; and
the plurality of electrically conductive dividers electrically connect the disk shaped permeable electrode of the one cell with the disk shaped impermeable electrode of the adjacent cell;
the plurality of electrically conductive dividers maintain a gap of the at least one electrolyte flow channel by spacing the disk shaped permeable electrode from the disk shaped impermeable electrode of the adjacent cell; and
the reaction zone comprises at least one insulating spacer which maintains a gap of the reaction zone by spacing the permeable electrode from the impermeable electrode.

28. The method of claim 27, wherein the plurality of dividers are curved and the radial flow of the metal halide electrolyte component and the liquefied halogen reactant comprises a spiral radial flow.

29. The method of claim 27, wherein the plurality of dividers comprise a plurality of curved discontinuous dividers which form a plurality of discontinuous flow channels that allow the metal halide electrolyte component and the liquefied halogen reactant from adjacent discontinuous flow channels to mix.

30. The method of claim 27, wherein the plurality of flow channels comprise a plurality of wedge shaped flow channels, each wedge shaped channel extending from the central outlet to one of a plurality of peripheral inlets.

31. The method of claim 22, wherein:
the radial flow of the metal halide electrolyte component and the liquefied halogen reactant is provided in discharge mode from the at least one peripheral inlet into the reaction zone, then from the reaction zone through the permeable electrode into the at least one flow channel, and then from the at least one flow channel into at least one central outlet; and the radial flow of the metal halide electrolyte component and the liquefied halogen reactant is provided in charge mode from the least one central inlet into the at least one flow channel, then from the at least one flow channel through the permeable electrode into the reaction zone, and then from the reaction zone to the at least one peripheral outlet.

32. The method of claim 22, wherein the step of providing the radial flow comprises providing the radial flow of the metal halide electrolyte component and the liquefied halogen reactant from a plurality of the peripheral inlets to a plurality of the central outlets.

33. The method of claim 25, further comprising providing a portion of the radial flow of the metal halide electrolyte component and the liquefied halogen reactant from the at least one peripheral or central inlet to a bypass outlet without providing any of the portion of the radial flow through the permeable electrode.

34. An electrochemical flow cell, comprising:
a permeable electrode;
an impermeable electrode located adjacent to and spaced apart from the permeable electrode;
a reaction zone electrolyte flow channel located between a first side of the permeable electrode and a first side of the impermeable electrode;
at least one electrolyte flow channel located adjacent to a second side of the permeable electrode;
at least one electrolyte bypass opening located at an end of the at least one electrolyte flow channel, the bypass opening configured to allow a portion of the electrolyte to flow between an electrolyte inlet and the bypass opening without having to flow through the permeable electrode.

35. The electrochemical flow cell of claim 34, wherein the at least one flow channel is tapered adjacent to at least one bypass opening and the portion of the electrolyte going through the bypass opening comprises from 0 to 100% of the electrolyte flow in the channel.

36. The electrochemical flow cell of claim 34, wherein:
the at least one bypass opening comprises at least one opening in a frame which supports the cell; and
least one opening in the frame is fluidly connected to an outlet manifold or conduit in the frame.

* * * * *

UNITED STATES PATENT AND TRADEMARK OFFICE
CERTIFICATE OF CORRECTION

PATENT NO. : 8,450,001 B2  
APPLICATION NO. : 12/877852  
DATED : May 28, 2013  
INVENTOR(S) : Brad Kell et al.

Page 1 of 1

It is certified that error appears in the above-identified patent and that said Letters Patent is hereby corrected as shown below:

Title Page, Item (54) and in the specification, Column 1, Lines 1 and 2, Title should read:

Flow Battery with Radial Electrolyte Distribution

Signed and Sealed this  
Fifteenth Day of October, 2013

Teresa Stanek Rea  
*Deputy Director of the United States Patent and Trademark Office*